United States Patent
Livanos et al.

(10) Patent No.: US 10,492,133 B2
(45) Date of Patent: Nov. 26, 2019

(54) SYSTEM AND METHOD TO FACILITATE OPTIMIZED ACCESS NETWORK SELECTION

(71) Applicant: CISCO TECHNOLOGY, INC., San Jose, CA (US)

(72) Inventors: Konstantin Livanos, Naperville, IL (US); Ian McDowell Campbell, Bow Mar, CO (US); Robert Glenn Smith, Voisins le Bretonneux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/282,823

(22) Filed: Sep. 30, 2016

(65) Prior Publication Data

US 2018/0098276 A1 Apr. 5, 2018

(51) Int. Cl.
*H04W 4/02* (2018.01)
*H04W 48/08* (2009.01)
(Continued)

(52) U.S. Cl.
CPC ........... *H04W 48/18* (2013.01); *H04W 4/025* (2013.01); *H04W 48/08* (2013.01); *H04W 48/14* (2013.01)

(58) Field of Classification Search
CPC ..... H04W 48/14; H04W 48/16; H04W 48/18; H04W 4/02
See application file for complete search history.

(56) References Cited

U.S. PATENT DOCUMENTS 9,119,139 B2 8/2015 Willey et al.
9,155,033 B2 10/2015 Buckley et al.
(Continued)

FOREIGN PATENT DOCUMENTS

WO 2013147587 A1 10/2013
WO WO 2016095974 A1 * 6/2016 ............ H04W 48/04
(Continued)

OTHER PUBLICATIONS

"ETSI TS 124 312 V13.2.0 (Apr. 2016) Technical Specification: Universal Mobile Telecommunication System (UMTS); LTE; Access Network Discovery and Selection Function (ANDSF) Management Object (MO) (3GPP TS 24.312 version 13.2.0 Release 13)," ETSI, 650 Route des Lucioles, F-06921 Sophia Antipolis Cedex—France; Apr. 2016; 393 pages.
(Continued)

*Primary Examiner* — Phirin Sam
*Assistant Examiner* — Debebe A Asefa
(74) *Attorney, Agent, or Firm* — Patterson + Sheridan, LLP

(57) ABSTRACT

An example method is provided in one example embodiment and may include provisioning a user equipment (UE) with a list comprising one or more locations at which the UE is to report its location; reporting a location of the UE when the location is identified in the list; provisioning the UE with one or more access network selection policy based on the reported location of the UE; and applying at least one access network selection policy at the UE based on the location of the UE. The list comprising the one or more locations can be sent to the UE from an Access Network Discovery and Selection Function (ANDSF) server after the UE reports its location to the ANDSF server. The one or more access network selection policies can be permanent type and/or temporal type policies.

20 Claims, 11 Drawing Sheets

(51) Int. Cl.
*H04W 48/14* (2009.01)
*H04W 48/18* (2009.01)

(56) References Cited

U.S. PATENT DOCUMENTS

| | | | |
|---|---|---|---|
| 2011/0021212 A1 | 1/2011 | Chen et al. | |
| 2011/0171953 A1 | 7/2011 | Faccin et al. | |
| 2014/0092871 A1 | 4/2014 | Wang et al. | |
| 2015/0173008 A1* | 6/2015 | Siddam | H04W 48/18 455/434 |
| 2015/0296440 A1 | 10/2015 | Forssell et al. | |
| 2015/0365789 A1 | 12/2015 | Salot et al. | |
| 2015/0382282 A1 | 12/2015 | Siddam | |

FOREIGN PATENT DOCUMENTS

| | | | | |
|---|---|---|---|---|
| WO | WO-2016095974 A1 * | 6/2016 | | H04W 48/04 |
| WO | 2018064067 A1 | 4/2018 | | |

OTHER PUBLICATIONS

"ETSI TS 123 402 V13.5.0 (Apr. 2016) Technical Specification: Universal Mobile Telecommunications System (UMTS); LTE; Architecture enhancements for non-3GPP Accesses (3GPP TS 23.402 version 13.5.0 Release 13)," ETSI, 650 Route des Lucioles, F-06921 Sophia Antipolis Cedex—France; Apr. 2016; 302 pages.

"OMA Device Management Standardized Objects, Approved Version 1.2.1—Jun. 17, 2008," Open Mobile Alliance Ltd., OMA-TS-DM_StdObj-V1_2_1-20080617-A; 29 pages.

"OMA Device Management Tree and Description, Candidate Version 1.2—Mar. 9, 2006," Open Mobile Alliance Ltd., OMA-TS-DM-TND-V1_2-20060309-C; 48 pages.

3GPP TS 22.278 V14.0.0 (Jun. 2016) Technical Specification: 3rd Generation Partnership Project; Technical Specification Group Services and System Aspects; Service requirements for the Evolved Packet System (EPS) (Release 14), 3GPP, 650 Route des Lucioles—Sophia Antipolis, Valbonne—France, 48 pages.

PCT Notification of Transmittal of the International Search Report and the Written Opinion of the International Searching Authority, or the Declaration for Application No. PCT/US2017/053522 dated Jun. 12, 2017.

* cited by examiner

100

100

400

600

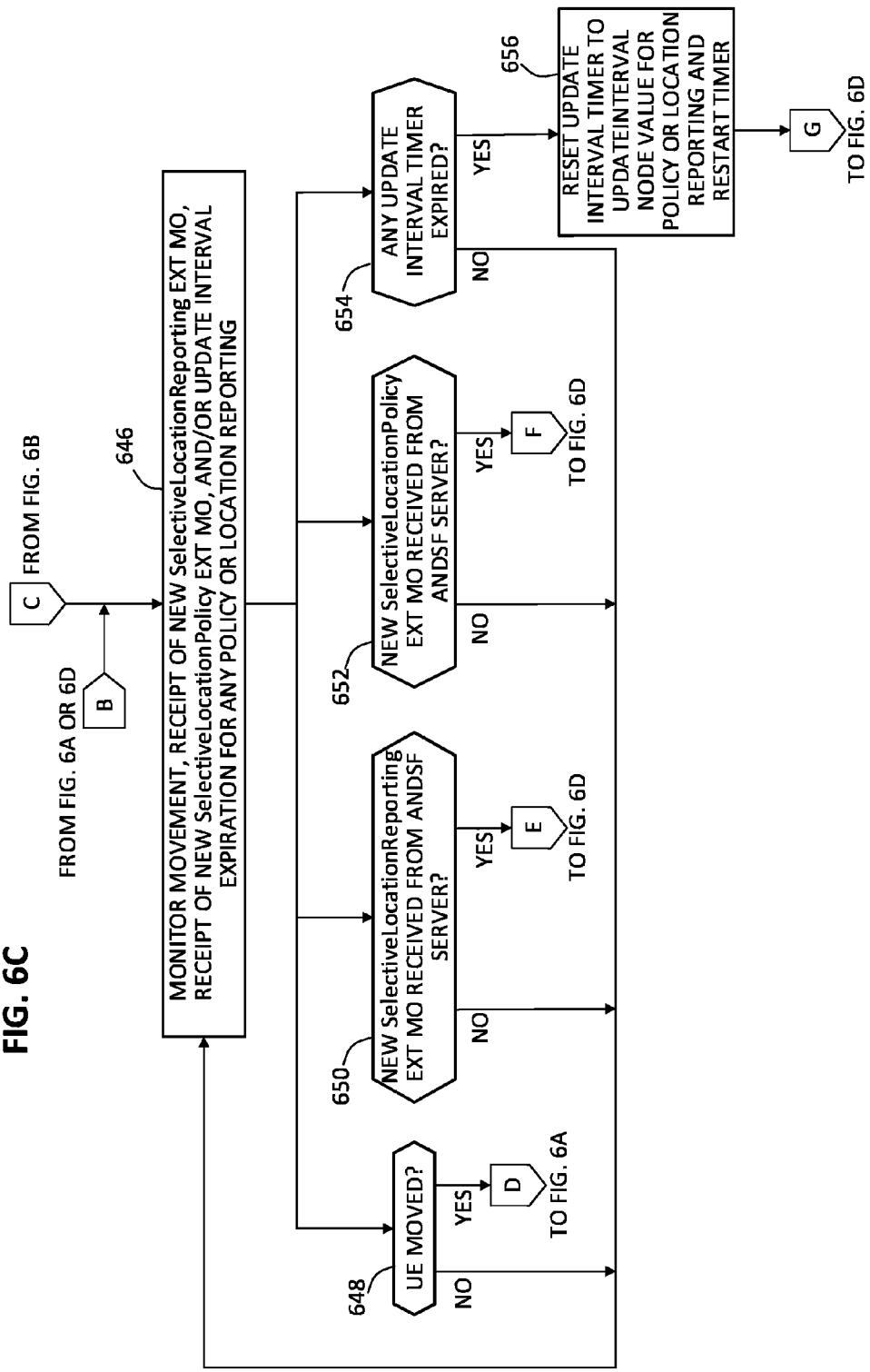

SYSTEM AND METHOD TO FACILITATE OPTIMIZED ACCESS NETWORK SELECTION

TECHNICAL FIELD

This disclosure relates in general to the field of communications and, more particularly, to a system and method to facilitate optimized access network selection.

BACKGROUND

Networking architectures have grown increasingly complex in communication environments. 3rd Generation Partnership Project (3GPP) standards define the capability to provide access network discovery and selection for user equipment. However, signaling over the interface to provide management for access network discovery and selection generates a significant load on network resources, which can impact the performance of network resources and, more importantly, consume radio resources for user equipment. Issues related to the impact on network resources and radio resources have impeded the adoption of the 3GPP standards. Accordingly, there are significant challenges in providing access network selection for user equipment.

BRIEF DESCRIPTION OF THE DRAWINGS

To provide a more complete understanding of the present disclosure and features and advantages thereof, reference is made to the following detailed description, taken in conjunction with the accompanying figures, wherein like reference numerals represent like parts, in which:

FIGS. 6A-6D are a simplified flow diagram illustrating yet other example details that can be associated with other example operations to facilitate providing optimized access network selection in accordance with one potential embodiment of the communication system.

DETAILED DESCRIPTION OF EXAMPLE EMBODIMENTS

Overview

A method is provided in one example embodiment and may include provisioning a user equipment (UE) with a list comprising one or more locations at which the UE is to report its location; reporting a location of the UE when the location is identified in the list; provisioning the UE with one or more access network selection policy based on the reported location of the UE; and applying at least one access network selection policy at the UE based on the location of the UE. The list comprising the one or more locations can be sent to the UE from an Access Network Discovery and Selection Function (ANDSF) server after the location of the UE is reported to the ANDSF server. The one or more access network selection policies can be permanent type and/or temporal type policies. The UE can be provisioned with only one temporal type policy at any time. In some instances, the method can include provisioning the UE with an update interval for a particular policy that indicates a time period upon expiration of which the UE is to send a policy request to the ANDSF server.

Example Embodiments

Figure 1A:
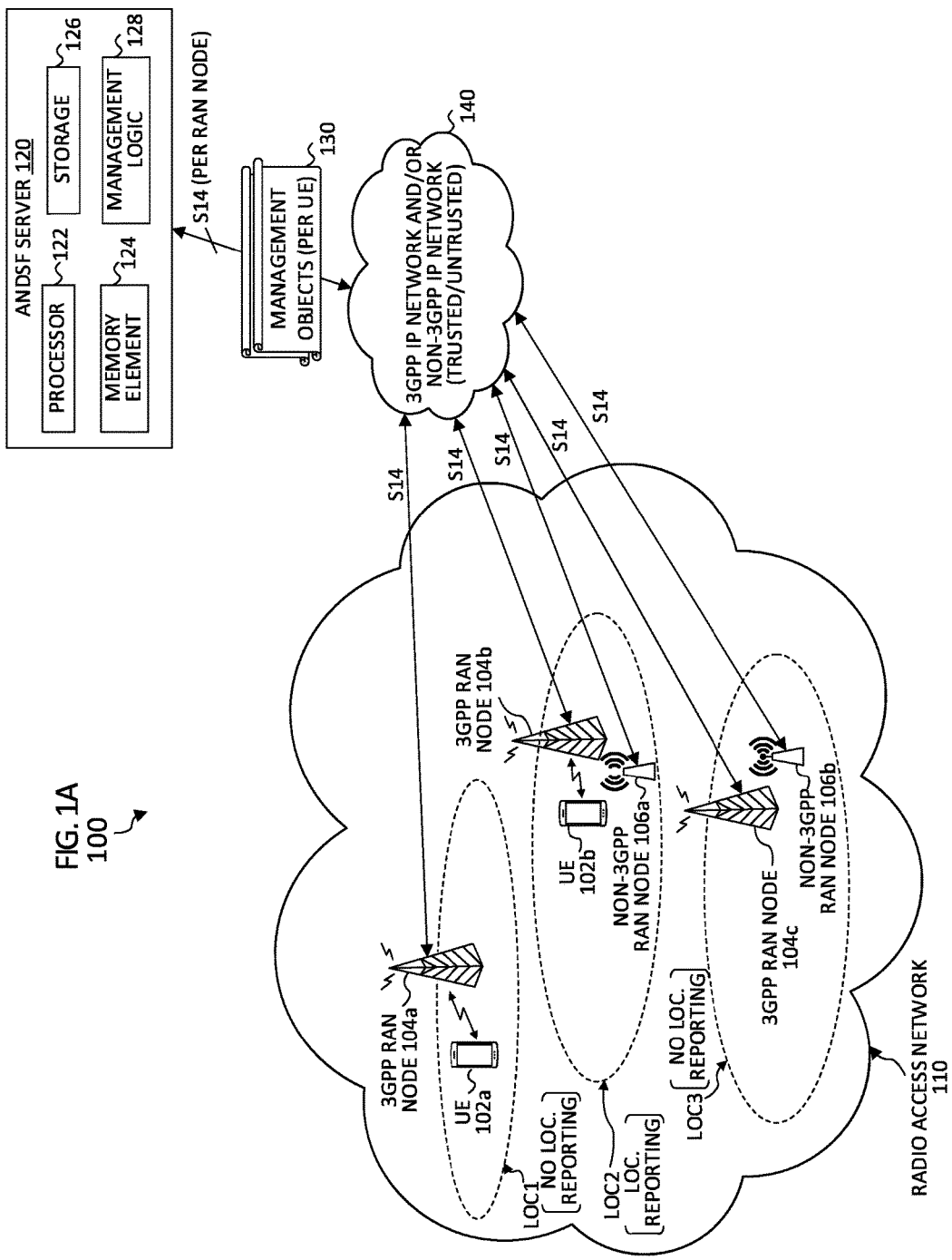
FIGS. 1A-1B are simplified block diagrams illustrating a communication system to facilitate optimized access network selection according to one embodiment of the present disclosure.
Figure 1B:
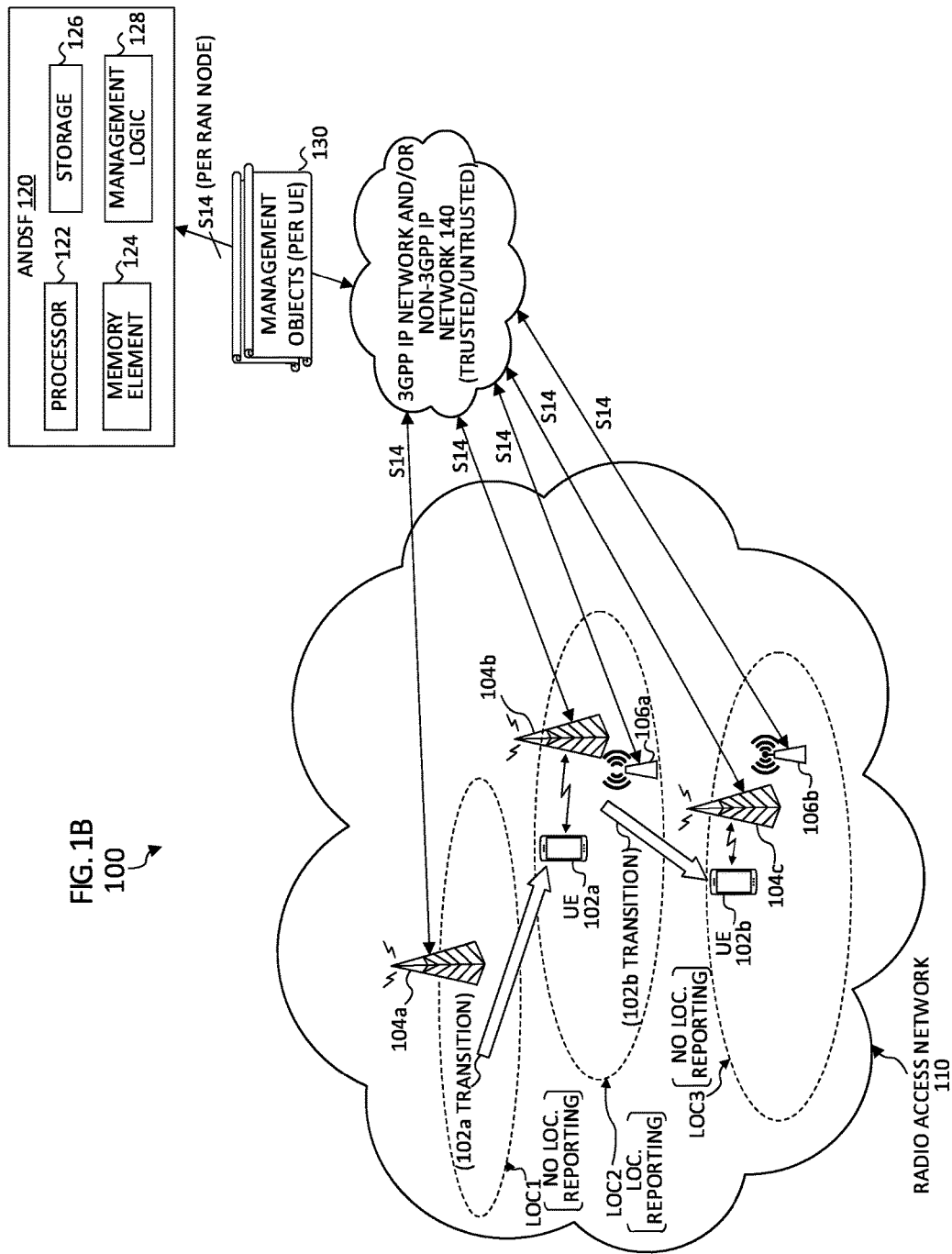

Referring to FIGS. 1A-1B, FIGS. 1A-1B are simplified block diagrams illustrating a communication system 100 to facilitate optimized access network selection according to one embodiment of the present disclosure. In at least one embodiment, communication system 100 can be associated with a 3rd Generation Partnership Project (3GPP) architecture such as a Long Term Evolution (LTE) architecture, sometimes referred to as 4th Generation (4G), which can include an Evolved Packet Core (EPC), sometimes referred to as a mobile packet core (MPC). In various embodiments, communication system 100 can be associated with other 3GPP architectures (e.g., 2nd Generation (2G), 3rd Generation (3G), 5th Generation (5G), etc.) and/or non-3GPP architectures (e.g., Institute of Electrical and Electronic Engineers (IEEE) 802.11 Wi-Fi, Worldwide Interoperability for Microwave Access (WiMAX), etc.

Communication system 100 can include one or more users operating user equipment (UE) 102a-102b, a Radio Access Network (RAN) 110, 3GPP RAN nodes 104a-104c, non-3GPP RAN nodes 106a-106b, an Access Network Discovery and Selection Function (ANDSF) server 120 and a 3GPP Internet Protocol (IP) network and/or a non-3GPP IP network 140. ANDSF server 120 can include at least one processor 122, at least one memory element 124, at least one storage 126 and management logic 128. FIGS. 1A-1B illustrate the same elements of communication system 100; however, FIG. 1B illustrates transitions of UE 102a and 102b to different locations within RAN in order to discuss various features and embodiments that can be associated with communication system 100.

RAN nodes within RAN 110 can be organized by location. For example, a first location (LOC1) can include 3GPP RAN node 104a, a second location (LOC2) can include 3GPP RAN node 104b and non-3GPP RAN node 106a, and a third location (LOC2) can include 3GPP RAN node 104c and a third location (LOC3) can include 3GPP RAN node 104c and non-3GPP RAN node 106b.

In various embodiments, a location can be identified using a Tracking Area Identity (TAI) or Code (TAC), a Routing Area Identity (RAI) or Code (RAC), a Location Area Identity (LAI) or Code (LAC), a Public Land Mobile Network (PLMN), a Cell Identifier (Cell-ID), a Service Set Identifier (SSID), a Basic Service Set Identifier (BSSID), and Extended Service Set Identifier (ESSID), a venue (e.g., a theater, stadium, arena, building, home, business, work, etc.), which might be defined using Latitude and Longitude (LAT/LON) coordinates and/or Global Positioning System (GPS) coordinates, combinations thereof or the like as may be defined in 3GPP standards, IEEE standards, Internet Engineering Task Force (IETF) standards, and/or by any other standard setting organizations. In various embodiments, a network operator or service provider can configure any combinations of locations using any location identifier and/or combination of location identifiers. Although three locations (LOC1-LOC3) are shown in FIGS. 1A-1B, it should be understood that any number of locations can be configured for a given RAN for a given deployment.

In the embodiment of FIG. 1A, UE 102a interfaces with 3GPP RAN node 104a via over-the-air Radio Frequency (RF) communications and UE 102b interfaces with 3GPP RAN node 104b in a similar manner. Each 3GPP RAN node 104a-104c and each non-3GPP RAN node 106a-106b can interface with ANDSF server 120 using a respective S14 interface, as defined in 3GPP standards, which can traverse one or more elements of 3GPP IP and/or non-3GPP IP networks 140 (e.g., depending on access network type).

Other interfaces can be provided for each RAN node, as defined in 3GPP standards, in accordance with various embodiments. It should be understood that although only three 3GPP RAN nodes and two non-3GPP RAN nodes are shown in FIGS. 1A-1B that any number of 3GPP and/or non-3GPP RAN nodes can be deployed in communication system 100 in accordance with various embodiments described herein. Similarly, although only two UEs are shown in FIGS. 1A-1B, any number of UEs can be present in communication system 100 in accordance with various embodiments described herein.

Each of the elements of FIGS. 1A-1B may couple to one another through simple interfaces or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' and/or 'signaling', which may be inclusive of packets. Generally, signaling is referred to in reference to control-plane packets while messaging can be referred to in reference to control-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network (PDN). Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a service gateway interface (SGi), a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like.

In general, RAN 110 may provide a communications interface via access network RAN nodes (e.g., 3GPP RAN nodes 104a-104c, non-3GPP RAN nodes 106a-106b) between UE 102a-102b, one or more elements and/or nodes of 3GPP IP and/or non-3GPP IP networks 140, and ANDSF server 120. In some embodiments, 3GPP IP and/or non-3GPP IP networks 140 can further interface with one or more Packet Data Networks (e.g., the internet). In various embodiments, 3GPP access networks can include Global System for Mobile Communications (GSM) Enhanced Data Rates for GSM (EDGE) Radio Access Network (GERAN), Universal Mobile Telecommunication System (UMTS) Terrestrial Radio Access Network (UTRAN), generally referred to as 3rd Generation (3G), and/or a LTE access network such as Evolved-UTRAN (E-UTRAN), generally referred to as 4th Generation (4G), LTE/LTE-Advanced (LTE-A) and/or 5th Generation (5G) 3GPP access networks. In various embodiments, non-3GPP access networks can include wireless local area networks (WLANs), such as IEEE 802.11 networks, Worldwide Interoperability for Microwave Access (WiMAX) networks, Bluetooth™ networks, combinations thereof or the like.

Before detailing operational aspects of various elements of FIGS. 1A-1B, certain contextual information is provided to offer an overview of access network selection as generally provided in commercial architectures. Such information is offered earnestly and for teaching purposes only and, therefore, should not be construed in a way to limit the broad applications for the present disclosure.

Current 3GPP standards (e.g., Technical Specification (TS) 23.402, 24.312, 22.278, etc.) define an Access Network Discovery and Selection Function (ANDSF) architecture that enables an ANDSF server in the network to provision access network selection policies at a 3GPP UE/subscriber device in order to connect to a specific access network, such as 3G, 4G or WLAN, when any of one or more conditions and/or validity criteria included in one or more network selection policies are met. An ANDSF client (e.g., software, logic, code, instructions, etc.) is provisioned for UE to enable communications between UE in the network and the ANDSF server, to enable storing and/or updating ANDSF parameters at UE and to enable access network discovery and selection operations to be performed by UE.

The communication between the ANDSF client at the UE and the ANDSF server is provided over the 3GPP defined S14 interface. Provisioning and management of parameters that UE can use for access network discovery and selection is provided using an ANDSF Management Object (MO) as defined in 3GPP TS 24.312 that can be managed by the ANDSF server. By 'provisioning', it is meant that the ANDSF server can send Management Objects to a given UE and the UE can store the Management Objects and/or update existing Management Objects previously stored at the UE.

In general, a Management Object can be configured as a 'subtree' of a management 'tree' that can include a collection of inter-related nodes. The ANDSF MO can include a number of 'node' and 'leaf' objects at which parameters can be configured to define access network discovery and selection operation for UE. The ANDSF MO is compatible with the Open Mobile Alliance (OMA) Device Management (DM) protocol specifications. Generally, an 'object', as referred to in object-oriented programming, can refer to an instance of a class (e.g., a template), which can be defined by one or more variables, functions and/or data structures. The ANDSF MO can be sent to UE using one or more messages communicated from the ANDSF server over the S14 interface.

In general, a node is a single element in a management tree that can include zero to many internal or interior nodes and/or zero to many leaf objects. Example Management Objects are discussed in further detail herein. A leaf object (sometimes referred to as a leaf node) can be used to store a parameter but cannot have internal nodes.

The nodes of the ANDSF MO can include, but not be limited to, one or more Policy nodes, a UE location node, a Discovery Information node, one or more EXTension (EXT) nodes or other nodes as defined in 3GPP TS 24.312.

The UE location node can be used to indicate the position of a given UE. According to current 3GPP standards (e.g., TS 24.312), updating the value of the UE location node can be triggered when location information in the node is no longer valid (e.g., if the UE has moved) or can be triggered using one or more manufacturer triggers. The value of the node is typically updated by the UE itself and doesn't imply any interaction with the ANDSF server. However, the decision of whether or not to interact with the ANDSF server is not left to the UE as doing so would prevent an operator from provisioning and activating location specific access network selection policies, which could result in inefficient network utilization and/or impact a user's quality of experience.

Per current 3GPP standards, a given UE can request new and/or updated policies from the ANDSF server each time it changes location (e.g., 3G or 4G Cell-ID, TAI, etc.), which can result in unnecessarily excessive signaling over the S14 interface given that, in some cases, the ANDSF server may not be interested in providing access network selection policies for all locations in the network.

In accordance with at least one potential embodiment, communication system 100 can facilitate optimized access network selection by ANDSF server 120 specifying a set of locations to UE for which it is interested in providing access network selection policies. The set of locations and access network selection policies can be communicated to UE using per-UE management objects 130 sent from the ANDSF server to each UE 102a-102b. The ANDSF server 120 can specify a set of one or more location(s) that it is interested in for each of UE 102a-102b by configuring a new location reporting management object, respectively, for each UE and sending the respective new management object to each UE. The new location reporting management object is referred to herein as a 'SelectiveLocationReporting EXT MO', which can be configured for an EXT node of the Policy node for an ANDSF MO tree configured for each UE.

During operation, a SelectiveLocationReporting EXT MO can be sent to a given UE (e.g., UE 102a) to specify a set of one or more locations (e.g., a list) at which the given UE is to report its location to the ANDSF server 120. In one embodiment, a set of locations can be first provisioned by the ANDSF server 120, via management logic 128, for a given UE ANDSF client when the UE first contacts the ANDSF server 120 requesting access network selection policies and the ANDSF client is installed at the UE.

When a given UE enters a location identified on its list, the ANDSF client for the UE triggers a policy PULL in which the UE sends a notification alert to the ANDSF server 120 to request location-specific policies, also referred to herein as 'policy instances'. In at least one embodiment, the notification alert can be of a type 'Generic Alert' as defined in 3GPP TS 24.312. In response to the notification alert, the ANDSF server 120 requests an identity of the user/UE (e.g., IMSI) and the location of the user/UE. The UE reports its location and identity to the ANDSF server 120. The ANDSF server 120 can then provision one or more polices for the UE based on the UE's location using another new location policy management object, referred to herein as a 'SelectiveLocationPolicy EXT MO'. In some embodiments, multiple policy instances can be configured for a same location. In various embodiments, various criteria or parameters can be set for access network selection policies to trigger selection and connection to one or more access networks by a UE including, but not limited to: UE capabilities; time of day, day of the week; current connection(s) such as, for example, IP flow, bearer type, Quality of Service (QoS) Class Identifier (QCI), RAN capabilities (e.g., throughput, congestion, load, etc.), channel quality (e.g., signal strength); access network type priority; validity area; combinations thereof or the like. In various embodiments, provisioning one or more policies for a given UE can include the ANDSF server 120 configuring one or more parameters for one or more policies within the SelectiveLocationPolicy EXT MO, sending the MO to the UE and the UE storing the policies contained in the MO. In some embodiments, policies provisioned for a UE by the ANDSF server 120 via a SelectiveLocationPolicy EXT MO may or may not be new or updated from one or more policies already stored at the UE for one or more locations. As referred to herein, a 'policy' configured for a SelectiveLocationPolicy EXT MO can also be referred to interchangeably as a 'policy instance'.

The UE can store or cache one or more access network selection policies using its own local copy of a SelectiveLocationPolicy EXT MO, which the UE can maintain based on any SelectiveLocationPolicy EXT MO received from the ANDSF server 120. In various embodiments, maintaining a SelectiveLocationPolicy EXT MO can include a UE removing one or more locally stored policy instances for one or more locations, updating one or more particular locally stored policy instances for one or more locations, updating one or more parameters for one or more locally stored policy instances for one or more locations and/or adding a new locally stored policy instance for one or more locations to the list of one or more policy instances maintained in the local SelectiveLocationPolicy EXT MO at the UE.

Based on a SelectiveLocationPolicy EXT MO received from the ANDSF server 120 by a given UE and a given location of the UE, the UE can apply one or more policies provisioned for the location by performing an access network selection following the parameters of the policies. Transitions by the UE to any other locations not included in the SelectiveLocationReporting EXT MO can be ignored for location reporting and policy requesting between the UE and the ANDSF server 120. Consequently, when the UE enters a location not included in its list, access network selection operations performed by the UE can rely on either a local connection manager UE policy configured for the UE or a default Inter-System Mobility Policy (ISMP) rule configured for the ANDSF client installed on the UE. For example, when a UE transitions to a location not included in its list of locations for location reporting, the UE can select an access network based on default policies configured for a local (e.g., non-ANDSF) connection manager operating on the UE if no ANDSF client is installed on the UE or no default ISMP is configured for an ANDSF client installed on the UE. As referred to herein, an ISMP rule can also be referred to more generally as a policy or policy instance.

In at least one embodiment, the SelectiveLocationReporting EXT MO can be configured with an 'UpdateInterval' node in which a time period can be defined such that upon expiration of the time period, a given UE can report its location to the ANDSF server 120 to request access network selection policies from the server. In at least one embodiment, the ANDSF server 120 can periodically update the list of locations it is interested in for a given UE by providing an updated SelectiveLocationReporting EXT MO to the UE.

In various embodiments, a SelectiveLocationReporting EXT MO configured for a given UE can be configured the same or different for different from other UE in the system. In various embodiments, configuration of the SelectiveLocationReporting EXT MO can be set based on one or more criteria, including but not limited to: subscriber policy information; UE capabilities; user/UE location; current connection(s) such as, for example, IP flow, bearer type, Quality of Service (QoS) Class Identifier (QCI), RAN capabilities (e.g., throughput, congestion, load, etc.), channel quality (e.g., signal strength); combinations thereof or any other criteria as may be defined by a network operator and/or service provider.

In various embodiments, location specific policies configured for a SelectiveLocationPolicy EXT MO can be classified as a 'permanent' type policy instance or a 'temporal' type policy instance. For example, a location such as a user's home may be classified as a permanent type policy while a policy for a stadium may be classified as a temporal type policy. To further optimize signaling over the S14 interface in accordance with one potential embodiment, the ANDSF server 120 does not need to explicitly request the removal of a current temporal type policy provisioned at a given UE when it provisions a new temporal type policy for the UE. Rather, the ANDSF client at the UE can be configured to delete a policy instance of a type temporal whenever the UE receives a new temporal type policy instance from the ANDSF server 120.

Consider an operational example involving UE 102*a* and 102*b* as shown in FIGS. 1A and 1B. Assume for the present operational example that ANDSF server 120 is not interested in providing access network selection policies for LOC1 or LOC3 and therefore neither LOC1 nor LOC3 are identified in a respective SelectiveLocationReporting EXT MO sent to each respective UE 102*a* and 102*b* while LOC2 is identified in each respective SelectiveLocationReporting EXT MO. As discussed for various embodiments described herein, LOC2 can be identified using a PLMN ID, TAI, LAC, cell ID, etc. within each respective SelectiveLocationReporting EXT MO sent to each respective UE 102*a* and 102*b*. For FIG. 1A, it is assumed that UE 102*b* would have been provisioned with at least one access network selection policy for LOC2.

As shown in FIG. 1B, it is assumed that UE 102*a* transitions to LOC2 from LOC1 and UE 102*b* transitions to LOC3 from LOC2. Transitioning to LOC2 by UE 102*a* would trigger a policy request and location update by UE 102*a* for LOC2 with ANDSF server 120 upon determining, by UE 102*a*, that LOC2 is identified in the SelectiveLocationReporting EXT MO provisioned at the UE. ANDSF server 120 would send one or more access network selection policy instances to UE 102*a* via a SelectiveLocationPolicy EXT MO including policy parameters for each policy instance for the location. UE 102*a* would apply at least one of the policy instances (e.g., depending on the criteria set for the one or more policy instances) to perform an access network selection in order to connect to 3GPP RAN node 104*b* and/or non-3GPP RAN node 106*a*. In some embodiments, UE 102*a* could connect to both a 3GPP RAN node and a non-3GPP RAN node for a given location (depending on policies configured for the location) for different traffic and/or flows (e.g., data traffic could be handled by a non-3GPP RAN node while voice traffic could be handled by a 3GPP RAN node, etc.). For the embodiment shown in FIG. 1B, it is assumed that UE 102*a* connects to 3GPP RAN node 104*b* upon transitioning to LOC2.

Transitioning to LOC3 by UE 102*b* would not trigger a policy request or location update by the UE via ANDSF server 120. However, a location update and policy request may still be triggered upon expiration of an UpdateInterval time period, if one is configured in the SelectiveLocationReporting EXT MO for the UE. Further, assuming that no location specific access network selection policies have been provisioned for UE 102*b* for LOC3, the UE would select an access network and RAN node (e.g., 3GPP RAN node 104*c*) to which to attach based on one or more local default connection policies configured for the UE.

Thus, communication system 100 can, in various embodiments, provide S14 signaling optimizations that can significantly reduce the signaling load over the S14 interface between UE and the ANDSF server 120 by enabling UE to request access network selection policies for a location when the UE enters a location that has been provisioned at UE using the new SelectiveLocationReporting EXT MO. Access network selection policies for a location can be sent to a UE from ANDSF server 120 using the new SelectiveLocationPolicy EXT MO that includes policy parameters for one or more policy instances configured for the location.

The signaling optimizations provided by communication system 100 can, in various embodiments, provide several advantages over the location reporting and policy request procedures currently defined in 3GPP standards in that location reporting and policy requests performed via communication system 100 can be enabled for one or more particular locations while excluding locations not of interest to the ANDSF server 120. Accordingly, in at least one embodiment, communication system 100 can provide signaling optimizations that reduce signaling traffic over the S14 interface as compared to the signaling defined for current 3GPP standards. In at least one embodiment, such signaling optimizations can lead to efficient access network selection policies that can be tailored to one or more particular locations. In at least one embodiment, such signaling optimizations can also improve the performance of the ANDSF server for ANDSF architectures.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE. In some embodiments, a given UE can be identified using a Medium Access Control (MAC) address and/or IP address for the UE.

In various embodiments, UE 102a-102b can be associated with any users, subscribers, employees, clients, customers, electronic devices, etc. wishing to initiate a flow in communication system 100 via some network. In at least one embodiment, UE 102a-102b can be configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 100. UE 102a-102b may also be inclusive of a suitable interface to a human user such as a microphone, a display, a keyboard, or other terminal equipment. It should be understood that a user, or more particularly, a subscriber, can be associated with the operation of a corresponding UE for one or more voice and/or data sessions.

UE 102a-102b may also be any device that seeks to initiate a communication on behalf of another entity or element such as a program, a database, or any other component, device, element, or object capable of initiating an exchange within communication system 100. In certain embodiments, UE 102a-102b may have a bundled subscription for network access and application services (e.g., voice), etc. In one embodiment, once the access session is established, the user can register for application services as well, without additional authentication requirements. Within communication system 100, IP addresses (e.g., for UE or any other element in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various embodiments, any of 3GPP RAN node 104a-104c can be deployed as: a Node B (NodeB) and/or Home NodeB (HNB) for 2G/3G macro and/or small cell deployments, respectively; an evolved NodeB (eNodeB or eNB) and/or Home eNodeB (HeNB) for 4G/LTE macro and/or small cell deployments, respectively; a 3GPP 5G macro and/or small cell radio node; combinations thereof or the like. In various embodiments, 3GPP RAN nodes 104a-104c can be configured with one or more transmitters, receivers and antennas to facilitate OTA communications. In general, a 3GPP RAN node can manage and schedule radio resources (e.g., for uplink and downlink communications) for UE connected thereto, can make handover decisions for UE and/or can select a Mobility Management Entity (MME) within a 3GPP IP network for UE session establishment.

In various embodiments, any of non-3GPP RAN node 106a-106b can be deployed as: an IEEE 802.11 Wi-Fi Access Point (AP) (e.g., any 802.11 variant, Hotspot variant, etc.); a WiMAX AP; combinations thereof or the like. In various embodiments, non-3GPP RAN nodes 106a-106b can be configured with one or more transmitters, receivers and antennas to facilitate OTA communications.

In general, 3GPP IP network and/or non-3GPP IP network 140 may provide a communications interface between UE 102a-102b within RAN 110, 3GPP IP network and/or non-3GPP IP network 140, one or more PDN, and ANDSF server 120. In various embodiments, 3GPP IP and/or non-3GPP IP networks can include one or more elements or nodes (e.g., depending on deployment type) as may be defined in 3GPP standards, IEEE standards, IETF standards, and/or by any other standard setting organizations including, but not limited to: one or more MME, one or more Mobile Switching Center (MSC), one or more Serving Gateway (SGW), one or more Serving General Packet Radio Service (GPRS) Support Node (SGSN), one or more PDN Gateway (PGW), one or more Gateway GPRS Support Node (GGSN), one or more one or more 3GPP AAA server, one or more Policy and Charging Rules Function (PCRF), one or more Home Subscriber Server (HSS), one or more Home Location Register (HLR), one or more Application Function (AF), one or more Wireless LAN Controller (WLC), one or more evolved Packet Data Gateway (ePDG), one or more Wireless Access Gateway (WAG), combinations thereof or the like.

In general for 3GPP IP networks, an MME can provide for UE tracking and paging procedures including, for example, retransmissions, tracking area list management, idle mode UE tracking, etc. An MME can further provide for UE bearer procedures including activation, deactivation and modification, SGW and PGW selection for UE and authentication services. An SGW is a data-plane element that can provide functionality for managing user mobility and interfaces with 3GPP RAN nodes (e.g., 3GPP RAN nodes 104a-104c). An SGW can also maintain data paths between RAN nodes and PGW(s). A PGW typically provides IP connectivity access network (IP-CAN) session connectivity for UEs to external PDNs.

In general for non-3GPP IP networks, a WLC can be responsible for system-wide wireless LAN functions such as, for example, for providing security policies, intrusion prevention, RF management, QoS capabilities and/or mobility services. A WAG can provide tunnel termination services and/or can manage subscriber sessions for IPv4 and/or IPv6 GRE, including EoGRE, access tunnels between a 3GPP IP network and non-3GPP RAN nodes 106a-160b. Generally, an ePDG can provide similar services as a WAG in untrusted non-3GPP access network environments.

In various embodiments, ANDSF server 120 can be deployed as any compute node, system, server, set of servers, combinations thereof or the like which can be embodied in a cloud-based and/or a data-center based environment. In at least one embodiment, at least one processor 122 for ANDSF server 120 is at least one hardware processor configured to execute various tasks, operations and/or functions of ANDSF server 120 as described herein. At least one memory element 124 and/or storage 126 can be configured to store data, information, software and/or instructions associated with the ANDSF server 120. For example, in various embodiments, at least one memory element 124 and/or storage 126 can be configured to store access network discovery and selection parameters, rules, etc. for configuring one or more access network selection policies using SelectiveLocationPolicy EXT MOs for UEs; one or more locations of interest for the ANDSF server 120 for one or more UE for configuring one or more location lists for UEs using SelectiveLocationReporting EXT MOs for the UEs; subscriber/UE information; logic (e.g., management logic 128 can, in some embodiments, be stored in at least one memory element 124 and/or storage 126), any other data, information software and/or instructions as discussed for various embodiments described herein, combinations thereof or the like.

In at least one embodiment, management logic 128 can include instructions that, when executed (e.g., by at least one processor 122), cause the ANDSF server 120 to perform one or more operations as discussed herein including, but not limited to: provisioning and managing, via the S14 interface, one or more SelectiveLocationReporting EXT MO for one or more UE for one or more locations of interest to the ANDSF server 120 for the one or more UE; provisioning and managing, via the S14 interface, one or more SelectiveLocationPolicy EXT MO for one or more UE for one or more policies for one or more locations of interest to the ANDSF server 120; exchanging communications with one or more UE via the S14 interface; exchanging communications with one or more elements or nodes of 3GPP IP network and or non-3GPP IP network 140; combinations thereof or any other operations described for various embodiments discussed herein.

Figure 2:
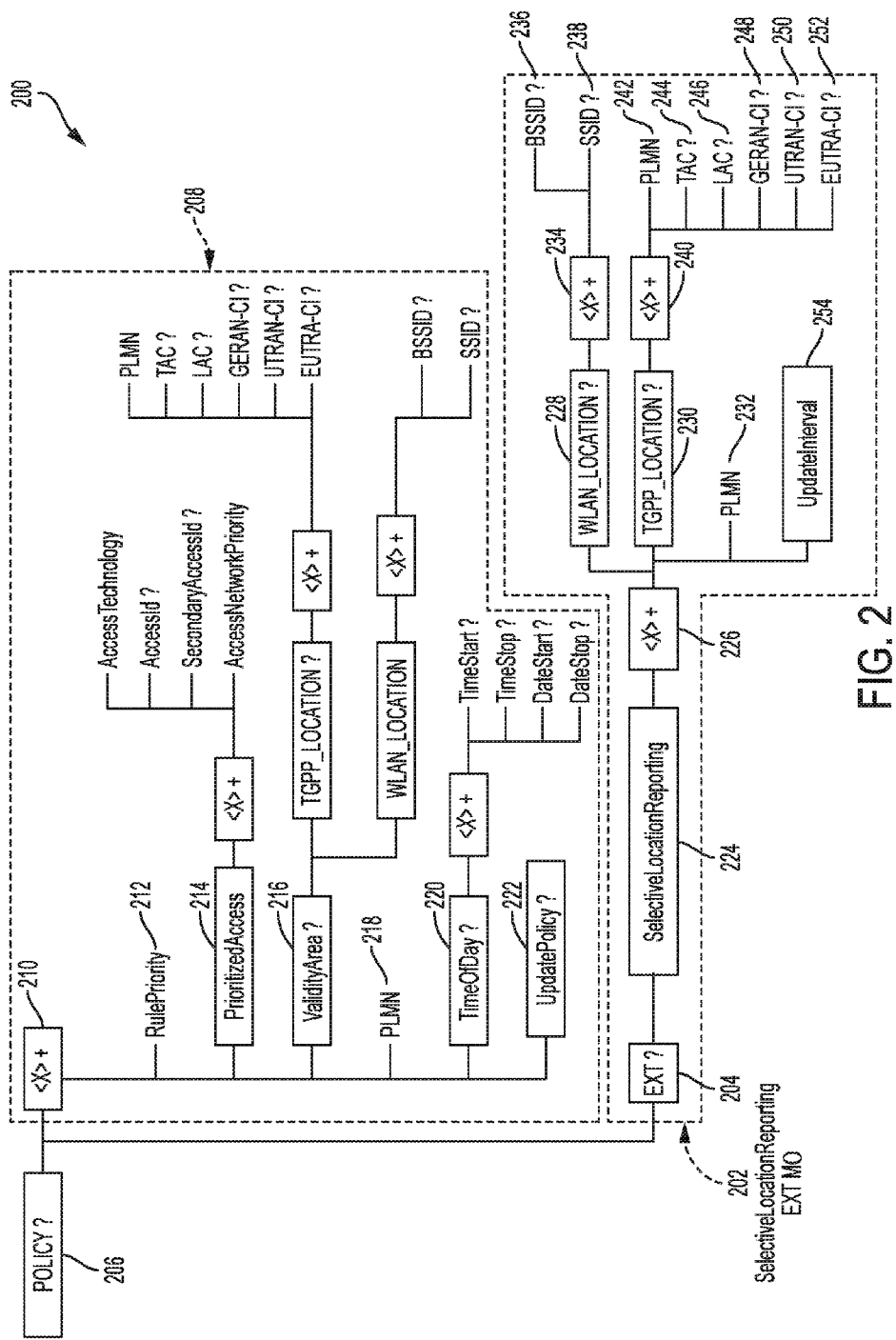
FIG. 2 is a simplified schematic diagram illustrating an example management object extension that can be used to facilitate optimized location reporting in accordance with one potential embodiment of the communication system.

Referring to FIG. 2, FIG. 2 is a simplified schematic diagram 200 illustrating an example SelectiveLocationReporting EXT MO 202 that can be used to facilitate optimized location reporting for a given UE in accordance with one potential embodiment of communication system 100. For the embodiment shown in FIG. 2, UE 102a is referenced with regard to the SelectiveLocationReporting EXT MO 202 for illustrative purposes only. It should be understood that that the SelectiveLocationReporting EXT MO 202 could be provisioned for any UE in communication system 100. The nodes or leaves of a MO can include certain notations such as '?', '+' or '*'. The '?' notation means that a leaf or node can have zero or one occurrences. The '+' notation means that a leaf or node can have one or many occurrences. The '*' notation means that a leaf or node can have zero or more occurrences. If a leaf or node has no notation shown then the default occurrence of the lead or node is exactly once. Nodes or leaves discussed for the embodiment of FIG. 2 will be discussed without referencing the notation accompanying the nodes or leaves.

As shown in the embodiment of FIG. 2, the SelectiveLocationReporting EXT MO 202 can be configured via an EXT node 204 of a Policy node 206 for an ANDSF MO. The ANDSF MO is not shown in FIG. 2, but it should be understood that Policy node 206 can be a node of the ANDSF MO, as defined in TS 24.312, Section 5.4.

The Policy node 206 can also be configured with one or more default ISMP rules such as, for example, a default ISMP rule 208 configured for an <x> node 210. The <x> node 210 is a placeholder for access network selection parameters for default ISMP rule 208. The access network selection criteria or parameters can be configured for one or more leaves or nodes including a RulePriority leaf 212, a PrioritizedAccess node 214, a ValidityArea node 216, a PLMN leaf 218, a TimeOfDay node 220 and an UpdatePolicy node 222. In at least one embodiment, the RulePriority leaf 212, PrioritizedAccess node 214, ValidityArea node 216, PLMN leaf 218 and TimeOfDay node 220 can be configured using parameters as indicated in 3GPP TS 24.312 and will not be discussed in additional detail herein. In at least one embodiment, default ISMP rule 208 can be applied by the ANDSF client installed at the UE for locations that are not included in its provisioned list of locations for which location reporting and location specific network selection have been configured. It should be understood that any number of additional ISMP rules could be configured for the UE under the Policy node 206.

Referring again to the SelectiveLocationReporting EXT MO 202, the EXT node 204 can be configured with a SelectiveLocationReporting node 224, which can further be configured with an <x> node 226 that can provide a placeholder for one or nodes and/or leaves in which parameters can be defined to identify one or more locations of interest of ANDSF server 120 for UE 102a. Any of the leaves or nodes of the SelectiveLocationReporting EXT MO 202 may or may not be defined to identify one or more locations of interest of the ANDSF server 120. Any location-based leaves or nodes as may be defined in 3GPP standards (e.g., as may be defined in 3GPP TS 24.312) can be used to identify location(s) of interest in a SelectiveLocationReporting MO. In various embodiments, the nodes and/or leaves of the SelectiveLocationReporting EXT MO 202 that may be used to identify one or more locations can include: a WLAN_Location node 228, a TGPP_Location node 230 and a PLMN leaf 232.

The WLAN_Location node 228 can be configured with an <x> node 234 that can be a placeholder for a BSSID leaf 236 and an SSID leaf 238, either or both of which that can be defined to identify non-3GPP location(s) of interest. The TGPP_Location node 230 can be configured with an <x> node that can be a placeholder for a PLMN leaf 242, a TAC leaf 244, a LAC leaf 246, a GERAN Cell-ID (GERAN_CI) leaf 248, a UTRAN_CI leaf 250 and a EUTRA_CI leaf 252, any or all of which that can be defined to identify 3GPP location(s) of interest. The PLMN leaf 232 can be defined for both 3GPP and non-3GPP location(s) of interest. In various embodiments, any of the leaves of the SelectiveLocationReporting EXT MO 202 can include one or more values defined therein (e.g., one or more SSIDs could be defined for SSID leaf 238, one or more TACs could be defined for TAC leaf 244, etc.) for one or more location(s) of interest to ANDSF server 120.

In some embodiments, an UpdateInterval node 254 can also be configured for the SelectiveLocationReporting EXT MO 202 for which a time period can be set for the UE to define when the UE is to request another SelectiveLocationReporting EXT MO and/or new and/or updated access network selection policies from the ANDSF server 120 for one or more location(s). In some embodiments, the UpdateInterval node 254 can be defined if a UE is expected to be stationary or approximately stationary for a period of time, at a particular location(s) (e.g., at home or work), or for some other reason as desired by a network operator and/or service provider.

Thus, as shown in the embodiment of FIG. 2, a SelectiveLocationReporting EXT MO (e.g., SelectiveLocationReporting EXT MO 202) can, in at least one embodiment, be used to define one or more location(s) of interest of the ANDSF server 120 for a given UE to trigger location reporting by the UE and/or to define an update interval for requesting new locations and/or access network selection policies from ANDSF server 120.

Figure 3:
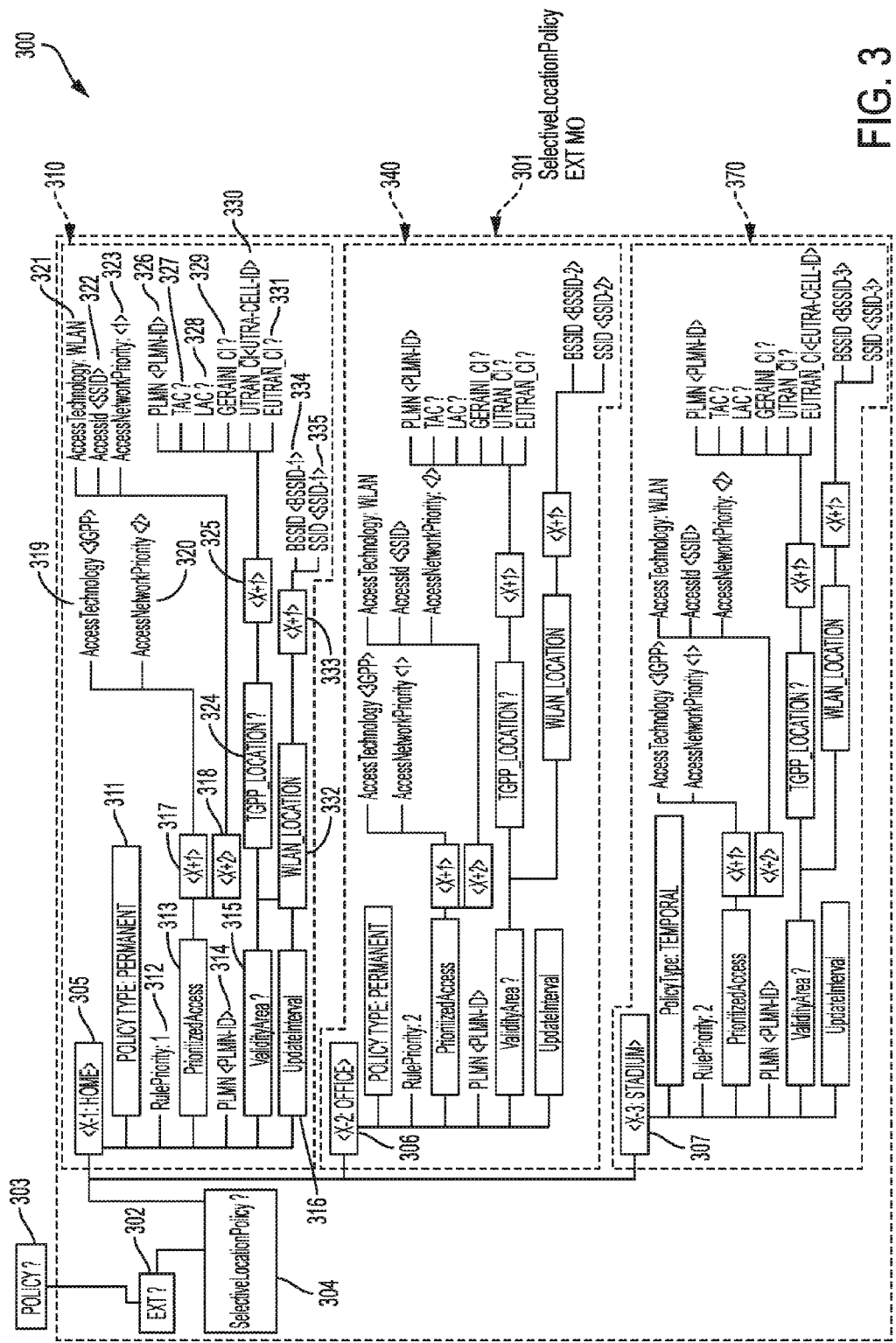
FIG. 3 is a simplified schematic diagram illustrating an example management object extension that can be used to facilitate optimized access network selection in accordance with one potential embodiment of the communication system.

Referring to FIG. 3, FIG. 3 is a simplified schematic diagram 300 illustrating an example SelectiveLocationPolicy EXT MO 301 that can be used to facilitate optimized access network selection for a given UE in accordance with one potential embodiment of communication system 100. For the embodiment shown in FIG. 3, UE 102a is referenced with regard to the SelectiveLocationPolicy EXT MO 301 for illustrative purposes only. It should be understood that that the SelectiveLocationPolicy EXT MO 301 could be provisioned for any UE in communication system 100. The '?', '+' or '*' notations for the nodes and leaves of the SelectiveLocationPolicy EXT MO 301 will not be referenced in the discussion for FIG. 3 but have the same meaning as discussed above for FIG. 2.

As shown in the embodiment of FIG. 3, the SelectiveLocationPolicy EXT MO 301 can be configured via an EXT node 302 of a Policy node 303 for an ANDSF MO. The ANDSF MO is not shown in FIG. 3, but it should be understood that Policy node 303 can be a node of the ANDSF MO, as defined in TS 24.312, Section 5.4.

The EXT node 302 can be configured with a SelectiveLocationPolicy node 304, which can further be configured with one or more <x> nodes that can be placeholders for one or more location-based access network selection policies such as, for example, a <x-1: Home> node 305 that can be used to define access network selection parameters for an example 'Home' location access network selection policy 310 for UE 102a, a <x-2: Office> node 306 that can be used to define access network selection parameters for an example 'Office' location access network selection policy 340 for the UE, and a <x-3: Stadium> node 307 that can be used to define access network selection parameters for an example 'Stadium' location access network selection policy 370 for the UE.

Although three access network policies are shown for the SelectiveLocation Policy EXT MO 301, it should be understood that any number of policies can be provisioned for a UE. Further, the location name for the policies is provided for illustrative purposes only and is not meant to limit the broad scope of the teachings of the present disclosure. It should be understood that any name could be configured for a policy. In some embodiments, multiple access network selection policies (e.g., policy instances) can be configured for each of one or more locations configured in a given SelectiveLocationPolicy EXT MO. Each policy instance configured for a particular location can have a different rule priority and can identify different criteria that can be used to perform access network selection at a particular location for a given UE. Policy instances can be applied in order of rule priority depending on whether one or more access network selection criteria are met in order for a given UE to attach to a particular access network.

During operation, a SelectiveLocationPolicy EXT MO, such as, for example, SelectiveLocationPolicy EXT MO 301, can be sent to a UE (e.g., UE 102a or 102b) to provision policies for one or more locations for the UE. For permanent type policies, a new permanent type policy of a different name than an existing policy or of a different rule priority for an existing priority can be appended to a SelectiveLocation Policy EXT MO that may already be stored at the UE. In at least one embodiment, any existing permanent type policy stored at a UE for which another policy having a same name and a same rule priority that is received in a SelectiveLocation Policy EXT MO received from the ANDSF server 120 can be updated with parameters contained in the received SelectiveLocation Policy EXT MO (e.g., if an existing Home location policy having a rule priority 1 is stored at a UE and another Home location policy having a rule priority 1 is received from the ANDSF server, then the Home location policy having rule priority 1 stored at the UE can be updated with parameters contained in the received MO). For temporal type policies, any temporal type policy stored at a UE will be automatically overwritten for any subsequently received temporal type policy.

Each example access network selection policy 310, 340, 370 for each location can include a number of nodes and leaves, any of which can be defined for each policy, that can be used as access network selection criteria by a given UE. In various embodiments, access network selection criteria that can be configured for an access network selection policy can include, but not be limited to: time of day, day of the week, congestion, signal strength information, access network type priority, validity area, combinations thereof or the like. Only one example policy, the Home location access network selection policy 310, is described in detail herein, but it should be understood that any access network selection based leaves or nodes as may be defined in 3GPP standards (e.g., as may be defined in 3GPP TS 24.312) can be used as parameters or criteria to facilitate location specific access network selection for a given UE. For example, although not shown in FIG. 3, signal strength thresholds and/or ranges can be set in accordance with various embodiments to trigger access network selection according to one or more policies based on signal strength information determined by a given UE for one or more RF signals that the UE may detect. In various embodiments, signal strength information can include Receive Signal Code Power (RSCP), Reference Signal Received Power (RSRP), Reference Signal Received Quality (RSRQ), Receive Signal Strength Indicator (RSSI), combinations thereof or the like.

The example Home location access network selection policy 310 can be configured with a PolicyType node 311, a RulePriority leaf 312, a PrioritizedAccess node 313, a PLMN leaf 314, a ValidityArea node 315 and an UpdateInterval node 316. The PolicyType node 311 is set to a 'permanent' type for the example policy 310, as is the PolicyType node for the example policy 340, while the PolicyType node for the example policy 370 is set to a 'temporal' type for the policy.

The RulePriority leaf 312 can set the rule priority for application of the example policy 310 in order to perform an access network selection. As discussed herein, multiple policy instances can be configured for one or more locations in some embodiments. In such embodiments, each policy instance configured for a particular location can be assigned a different rule priority. During operation, each rule for a particular location can be applied in increasing order from rule priority 1 depending on whether the criteria for a higher priority rule have been met or not. For example, if selection criteria for a priority 1 rule are not met, then a given UE can check whether the selection criteria for a priority 2 rule, if provisioned, are met in order for the UE to perform an access network selection. As shown in the embodiment of FIG. 3, the rule priority for policy 310 is set to 1, while the priority for policy 340 and 370 is set to 2.

The PrioritizedAccess node 313 can be used to define one or more preferred access network types for the example policy 310 and can be configured with a number of <x> nodes which can provide for a number of prioritized preferred accesses. An <x+1> node 317 can be a placeholder for 3GPP prioritized access leaves including an AccessTechnology leaf 319 indicating a 3GPP access network type and an AccessNetworkPriority leaf 320 set to two (2). An <x+2> node 321 can be a placeholder for WLAN prioritized access leaves including an AccessTechnology leaf 318 indicating a WLAN access network type, an AccessId leaf 322 indicating a preferred SSID for the access network and an AccessNetworkPriority leaf 323 set to one (1). Thus, for policy 310, the WLAN access network type (e.g., non-3GPP) would be the more preferred access network type for UE 102a for the Home location. It should be understood that any priority can be configured for the network types defined for the PrioritizedAccess node. As shown for the Office policy 340, the 3GPP access network type priority is set to one while the WLAN access network type is set to two.

The ValidityArea node 315 can be used to define one or more location specific criteria that are to be met for application of the example policy 310 in order to select a corresponding access network to which to attach. The location conditions can be set for 3GPP locations via a TGPP_Location node 324 and/or for WLAN locations (e.g., non-3GPP) via a WLAN_Location node 332. The TGPP_Location node 324 can include an <x−1> node 325 that can be a placeholder for one or more 3GPP location identifiers including: a PLMN leaf 326, a TAC leaf 327, a LAC leaf 328, a GERAN-CI leaf 329, a UTRAN-CI leaf 330 and a EUTRA-CI leaf 331, any or all of which that can be defined to identify 3GPP location(s) at which the Home policy 310 is to be applied. As shown for the Home policy 310, the PLMN leaf 326 can be set to a given PLMN-ID and the UTRAN-CI leaf 330 can be set to a UTRA-Cell-ID for the Home location example policy 310. The WLAN_Location node 332 can include an <x−1> node 333 that can be a placeholder for one or more WLAN location identifiers including: a BSSID leaf 334 and an SSID leaf 335.

In at least one embodiment, the UpdateInterval node 316 can be configured in to define a time period such that upon expiration of the time, period UE 102a can request updates for the example Home policy 310 and/or any new or other policies that may be configured for the UE by ANDSF server 120.

Figure 4:
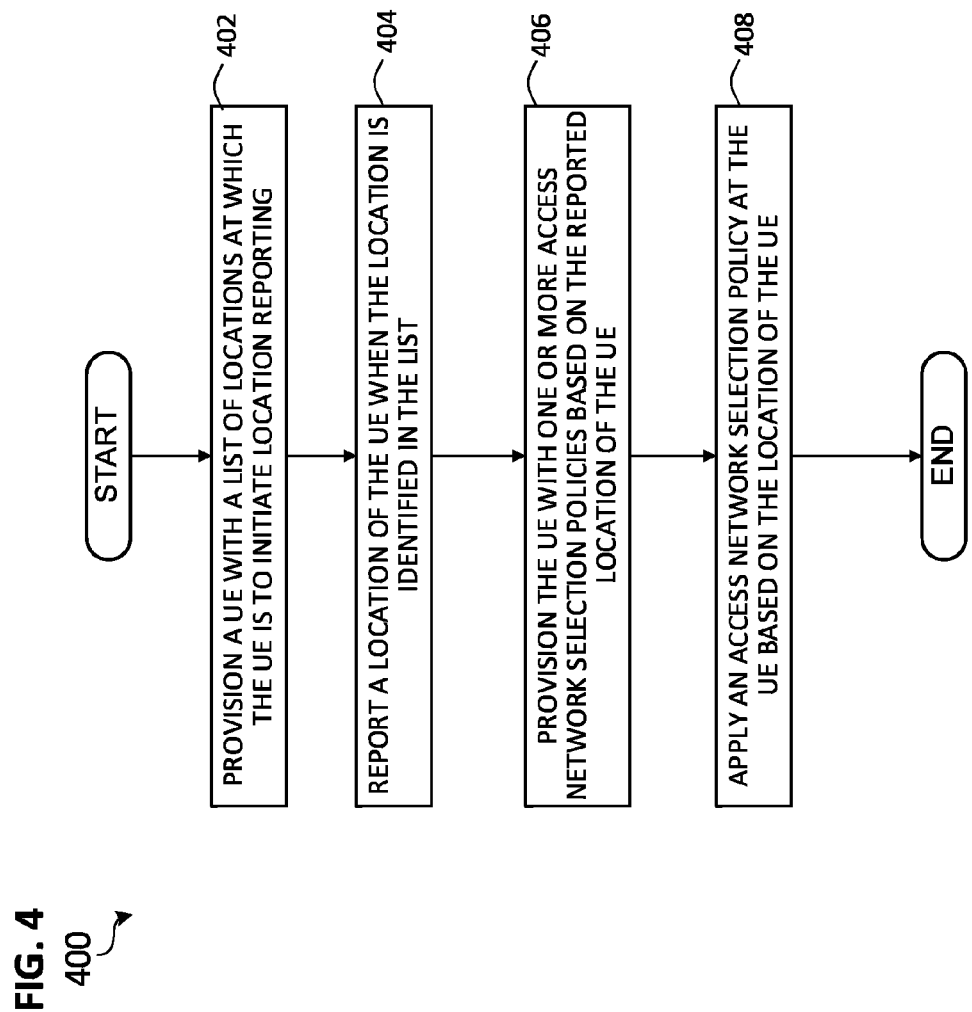
FIG. 4 is a simplified flow diagram illustrating example details that can be associated with example operations to facilitate providing optimized access network selection in accordance with one potential embodiment of the communication system.

Referring to FIG. 4, FIG. 4 is a simplified flow diagram illustrating example details that can be associated with example operations 400 to facilitate providing optimized access network selection in accordance with one potential embodiment of communication system 100.

Beginning at 402, the operations can include provisioning a UE (e.g., UE 102a, UE 102b or both, in which case both UE could be provisioned separately) with a list of locations at which the UE is to initiate location reporting. In various embodiments, the provisioning can include configuring a SelectiveLocationReporting EXT MO for the UE, sending the MO to the UE and the UE storing the MO.

At 404, the operations can include reporting, by the UE a location of the UE when the location is identified in the list. The location reporting can be sent to an ANDSF server (e.g., ANDSF server 120) following the UE sending a notification alert to the ANDSF server requesting network selection policies from the server and the ANDSF requesting an identity of the user/UE and the location of the user/UE.

At 406, the operations can include provisioning the UE with one or more access network selection policies based on the reported location of the UE. In various embodiments, the provisioning can include configuring a SelectiveLocationPolicy EXT MO for the UE, sending the MO to the UE and the UE storing the MO.

As discussed herein, the UE can maintain a local SelectiveLocationPolicy EXT MO which can include one or more policies for one or more locations. In some embodiments, maintaining a local SelectiveLocationPolicy EXT MO can include removing an existing temporal type policy at a UE and replacing it with a new temporal type policy if one is configured in the MO. In still some embodiments, maintaining a local SelectiveLocationPolicy EXT MO can include updating an existing permanent type policy at a UE if the existing permanent type policy currently stored at the UE has a same name and rule priority as a permanent type policy configured in the MO. In still some embodiments, maintaining a local SelectiveLocationPolicy EXT MO can include adding a new policy for a location to the local SelectiveLocationPolicy EXT MO maintained at the UE. In still some embodiments, maintaining a local SelectiveLocationPolicy EXT MO can include updating all existing permanent type policies at a UE.

At 408, the operations can include applying an access network selection policy by the UE based on the location of the UE. The policy can be applied based on parameters for the at least one policy stored in the local SelectiveLocationPolicy EXT MO maintained at the UE. The policy that is applied can be one of multiple policies configured for a particular location. In at least one embodiment, applying an access network selection policy by a UE based on a location of the UE can include the UE performing access network selection(s) for one or more connections (e.g., 3GPP and/or non-3GPP) according to parameters or criteria set for one or more policies provisioned for the location. As discussed for various embodiments described herein, a given UE can apply access network selection policies to select one or more access networks to which to connect for different traffic or data flows based on various criteria and/or parameters identified in the policies maintained at the UE.

Figure 5:
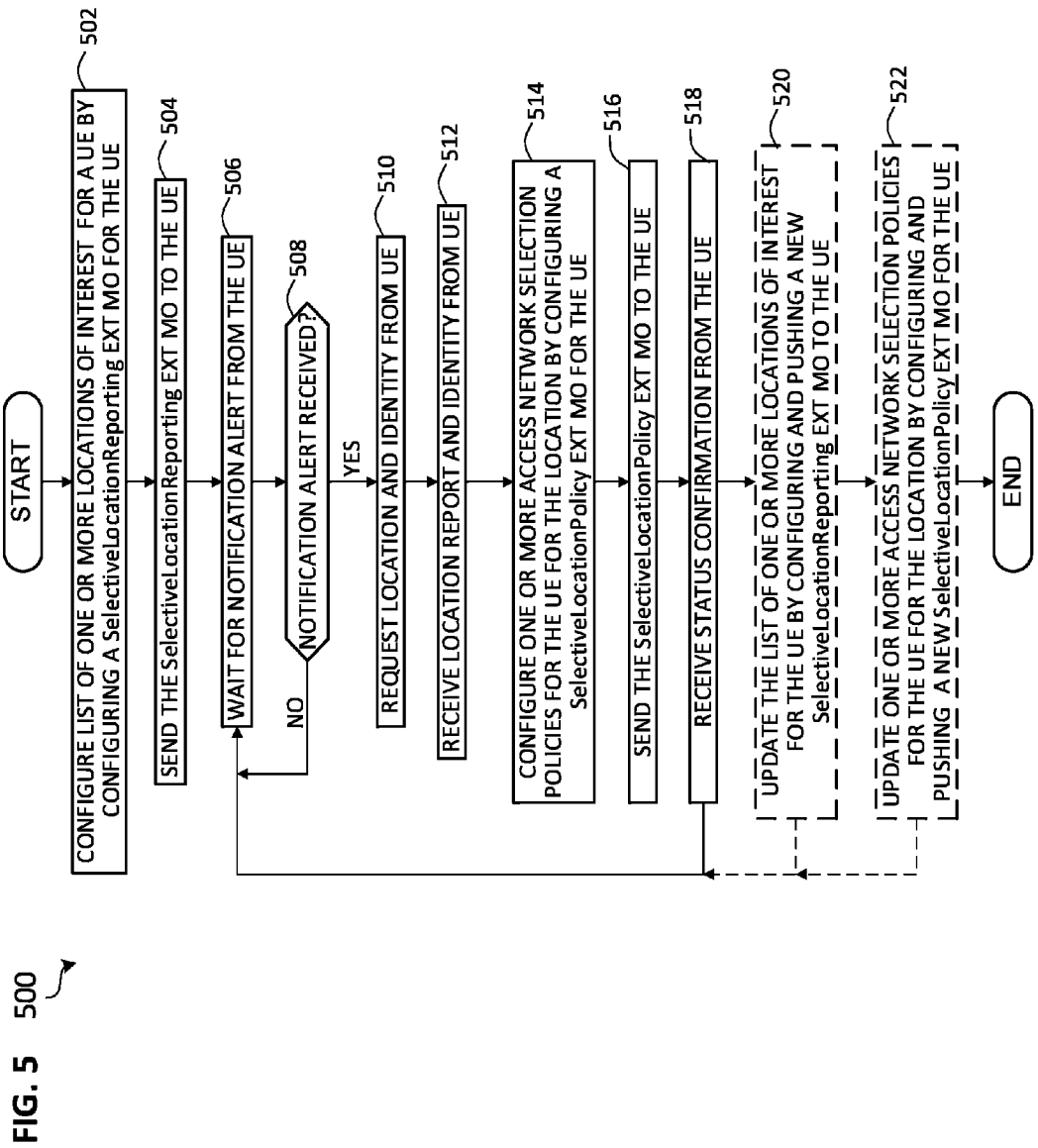
FIG. 5 is a simplified flow diagram illustrating other example details that can be associated with other example operations to facilitate providing optimized access network selection in accordance with one potential embodiment of the communication system.

Referring to FIG. 5, FIG. 5 is a simplified flow diagram illustrating other example details that can be associated with other example operations 500 to facilitate providing optimized access network selection in accordance with one potential embodiment communication system 100. In particular, operations 500 can be associated with operations that can be performed by ANDSF server 120, in accordance with one potential embodiment of communication system 100.

Beginning at 502, ANDSF server 120 configures a list of one or more locations of interest for a given UE (e.g., UE 102a, 102b or both, in which case a list could be configured for each UE) by configuring a SelectiveLocationReporting EXT MO for the UE. In various embodiments, one or more parameters of the SelectiveLocationReporting EXT MO can be defined according to one or more location identifiers for 3GPP and/or non-3GPP (e.g., WLAN) locations.

At 504, the ANDSF server 120 sends the SelectiveLocationReporting EXT MO to the UE. In at least one embodiment, operations 502 and 504 can be performed upon installing an ANDSF client at the UE. Thus, in at least one embodiment, operations 502 and 504 assume that the UE has a session established with ANDSF server 120. At 506 and 508 the ANDSF server 120 waits for a notification alert from the UE. The UE can send a notification alert to the ANDSF server 120 requesting network selection policies from the server when the UE either transitions to a location identified in its SelectiveLocationReporting EXT MO or when the time period set that may be configured for an update interval has expired. If no notification alert is received from the UE, the ANDSF server 120 continues to wait for a notification alert. However, if a notification alert is received from the UE, the ANDSF server 120 requests a location and identity of the UE from the UE at 510. At 512, The ANDSF server receives a location report and identity from the UE.

At 514, the ANDSF server configures one or more access network selection policies for the UE for the location by configuring a SelectiveLocationPolicy EXT MO for the UE. At 516, the ANDSF server 120 sends the SelectiveLocationPolicy EXT MO to the UE. At 518, the ANDSF server 120 receives a status confirmation from the UE indicating that the UE successfully provisioned the one or more access network selection policies included in the SelectiveLocationPolicy EXT MO and the operations return to 506 to continue to wait for notification alerts from the UE and the operations can continue as described above.

In at least one embodiment, the ANDSF server 120 can update, at 520, the list of one or more locations of interest for the UE by configuring and pushing a new SelectiveLocationReporting EXT MO to the UE and the operations can return to 506 at which the ANDSF server 120 awaits a notification alert from the UE and the operations can continue as described above. In at least one embodiment, the ANDSF server 120 can, at 522, update one or more access network selection policies for the UE by configuring and pushing a new SelectiveLocationPolicy EXT MO to the UE and the operations can return to 506 at which the ANDSF server 120 awaits a notification alert from the UE and the operations can continue as described above.

Referring to FIGS. 6A-6D, FIGS. 6A-6D are a simplified flow diagram illustrating yet other example details that can be associated with other example operations 600 to facilitate providing optimized access network selection in accordance with one potential embodiment of communication system 100. In particular, operations 600 can be associated with operations that can be performed by a given UE, in accordance with one potential embodiment of communication system 100. For the embodiment shown in FIGS. 6A-6D, UE 102b is referenced for illustrative purposes only. It should be understood that any UE can perform operations as shown in FIGS. 6A-6D. Further for the embodiment shown in FIGS. 6A-6D, it is assumed that an ANDSF client is installed for UE 102a to perform one or more operations discussed herein and that the UE has a session established with ANDSF server 120.

At 602, the operations can include UE 102a receiving a first list (e.g., no previously stored list exists at the UE) of locations of interest from the ANDSF server 120 via a SelectiveLocationReporting EXT MO sent to the UE. At 604, the UE 102a stores the list of locations. In one embodiment, a UE can store a local copy of a SelectiveLocationReporting EXT MO, which can be updated by the ANDSF server 120.

At 606, UE 102a determines whether an UpdateInterval node is defined for the SelectiveLocationReporting EXT MO. If the UpdateInterval node is defined, the operations can continue to 608 at which UE 102a initializes an update interval time to the value of the UpdateInterval node. At 610, UE 102a starts the update interval timer and the operations continue to 612. If the UpdateInterval node is not defined for the SelectiveLocationReporting EXT MO, operations 608 and 610 are skipped and the operations instead continue to 612.

At 612, the location of UE 102a is determined. In various embodiments, the UE can determine its location based on one or more location identifiers for the UE, which the UE can gather as the UE moves throughout communication system 100, attaches to RAN nodes, exchanges communications with one or more elements or nodes of 3GPP IP network and/or non-3GPP IP network 140, combinations thereof or the like. At 614, UE 102a determines whether its location is identified in the list of locations received from the ANDSF server 120.

If UE 102a does determine that its location is identified in the list received from ANDSF server 120, the operations continue to 616 at which UE 102a sends a notification alert to the ANDSF server 120 requesting network selection policies from the server for the location. At 618, UE 102a receives a location and identity request from the ANDSF server 120. At 620, UE 102a reports its location and identity (e.g., IMSI) to ANDSF server 120 and the operations continue to 622 shown in FIG. 6B.

If, at 614, UE 102a does not determine that its location is identified in the list received from ANDSF server 120, the operations continue to 646 shown in FIG. 6C. Generally, operations 646-656 shown in FIG. 6C are operations that the UE can perform to monitor whether: the UE has moved (648); whether a new SelectiveLocationReporting EXT MO has been received from the ANDSF server (650); whether a new SelectiveLocationPolicy EXT MO has been received from the ANDSF server (652); and/or to determine whether any update interval timer for any access network selection policy or location reporting (e.g., via the UpdateInterval node that can be set for the SelectiveLocationReporting EXT MO) has expired (654, 656). The operations shown in FIG. 6C are discussed in further detail below.

Recall the transition of operations from 614 to 620 and to 622, as discussed above. At 622, UE 102a receives one or more access network selection policies for the location via a SelectiveLocationPolicy EXT MO received from the ANDSF server 120 for the location. At 624, UE 102a determines whether it currently has any policies stored that have been received from the ANDSF server 120.

If no policies are stored at the UE, the operations continue to 626 at which the UE 102a stores the one or more access network selection policy received from the ANDSF server 120. The UE can store the one or more access network selection policy in a local SelectiveLocationPolicy EXT MO maintained by the UE. The operations can continue to 644 at which UE 102a applies at least one access network selection policy based on its location to perform access network selection(s) according to one or more policies stored at the UE and the operations continue to 646 shown in FIG. 6C. As discussed for various embodiments described herein, a given UE can apply access network selection policies to select one or more access networks to which to connect for different traffic or data flows based on various criteria and/or parameters identified in the policies maintained at the UE.

If, at 624, the UE determines that there are one or more access network selection policies stored at the UE, the operations can continue to 628 at which the UE determines the policy type for each received policy. For each received policy, the UE performs various operations in a looping manner on each policy to evaluate each received access network selection policy in light of previously stored policies. In evaluating the received policies, the UE can update previously received policies and/or store any new received policies that do not match any previously received policies. The looping evaluation operations can include operations 630, 632, 634, 636, 638, 640 and 642, depending on the types of policies received in a SelectiveLocationPolicy EXT MO.

For each loop, depending on the number of policies received in the SelectiveLocationPolicy EXT MO, UE 102a determines at 630 whether a particular received access network selection policy type under evaluation is a permanent type policy. If the UE determines that a particular received access network selection policy type under evaluation is a permanent type policy, the operations continue to 632 at which the UE determines whether there exists any currently stored permanent type policy having a same name (e.g., for a same location) and a same rule priority as that of the particular permanent type access network selection policy received from the ANDSF server 120.

If there is another currently stored access network selection policy having a same name and a same rule priority as that of the particular permanent type access network selection policy received from the ANDSF server 120 under evaluation, the operations can continue to 634 at which UE 102a updates the stored permanent type access network selection policy having a matching name and rule priority as that of the particular permanent type access network selection policy received from the ANDSF server 120 using parameters defined in the received SelectiveLocationPolicy EXT MO for the particular matching permanent type access network selection policy and the operations continue to 637 at which the UE determines whether there is any remaining received policy that needs to be evaluated for updating/storing locally. If the UE determines that there is a remaining policy, the operations return to 630 and the UE evaluates the remaining policy as discussed herein. Otherwise, if the EU determines that there are no remaining policies to evaluate, the operations can continue to 644 at which UE 102a applies at least one access network selection policy based on the location of the UE to perform access network selection(s) according to one or more policy stored at the UE and the operations continue to 646 shown in FIG. 6C.

Recalling 632, if there is not another currently stored permanent type access network selection policy having a same name (e.g., for a same location) and rule priority as that of the particular permanent type policy under evaluation received from the ANDSF server 120, then the particular policy is considered by to be a new policy for UE 102a and the operations can continue to 636 at which UE 102a stores the new permanent type access network selection policy with parameters defined in the received SelectiveLocationPolicy EXT MO. The operations can then continue to 637 as described above.

Recalling 630, if UE 102a determines that the particular received access network selection policy under evaluation is not a permanent type policy (e.g., it is a new temporal type policy), the operations can continue to 638 at which the UE determines whether it has a currently stored temporal type policy. If the UE determines that it does have a stored temporal type policy, the operations can continue to 640 at which the UE removes the current temporal type policy and 642 at which the UE stores the new temporal type policy. If the UE determines that it does not have a stored temporal type policy, the operations can continue to 638 from 642. From 642, the operations can continue to 637 as described above. Once all newly received policies are evaluated by the UE, the operations can continue to 644, as discussed previously, at which UE 102a applies at least one access network selection policy based on the location of the UE to perform one or more access network selection(s) according to one or more policy stored at the UE and the operations continue to 646 shown in FIG. 6C.

In some embodiments, any of the storing and/or updating operations that may be performed at 634, 636 and/or 642 can include setting and monitoring an update interval timer for a corresponding policy. In some embodiments, policies can be configured with different update intervals. In some embodiments, the storing and/or updating operations illustrated in FIG. 6B can be repeated for each of multiple locations (e.g., policy names) if policies for multiple locations (e.g., not just the current location of the UE) are received in a SelectiveLocationPolicy EXT MO from the ANDSF server 120.

Figure 6A:
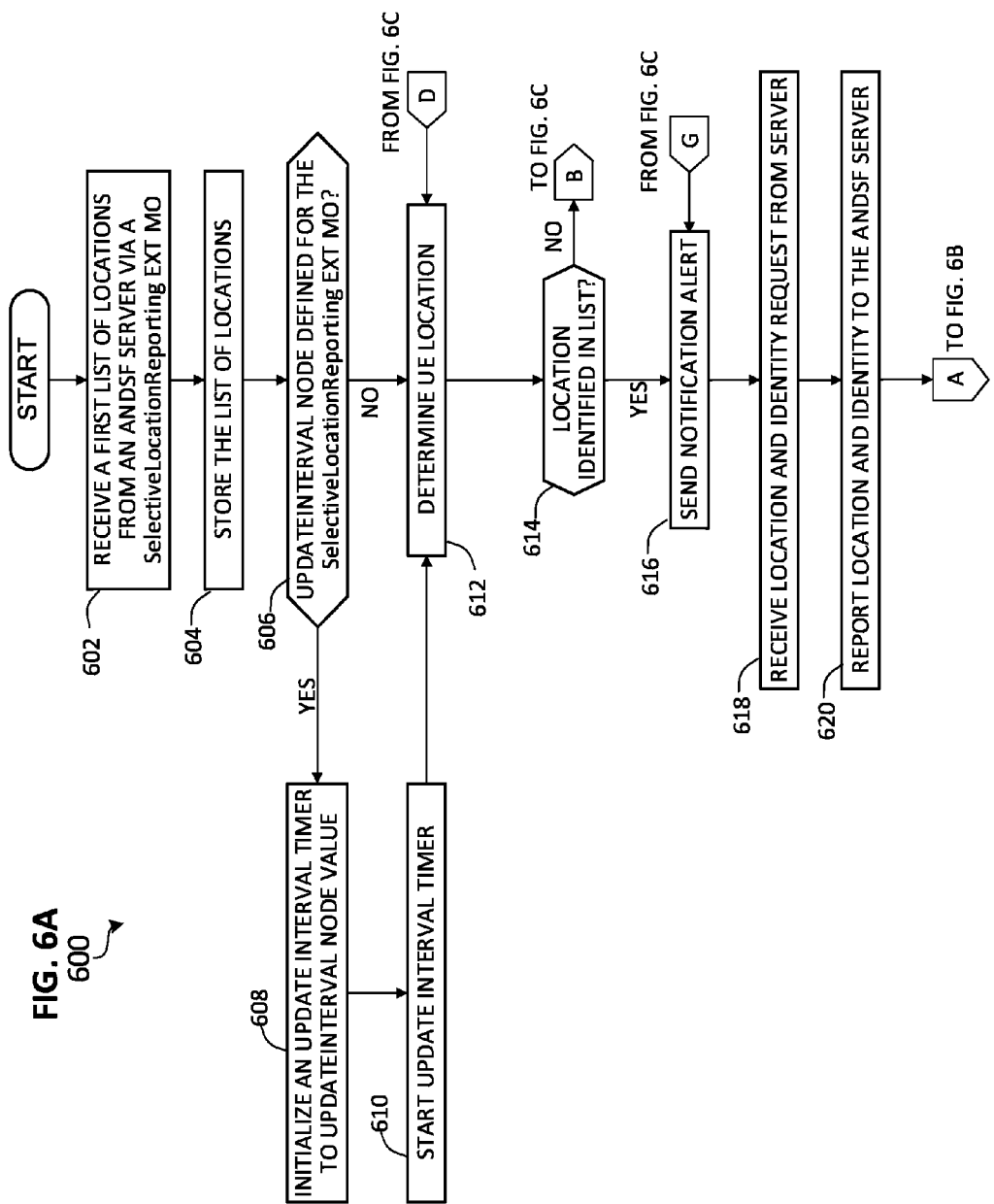
Figure 6B:
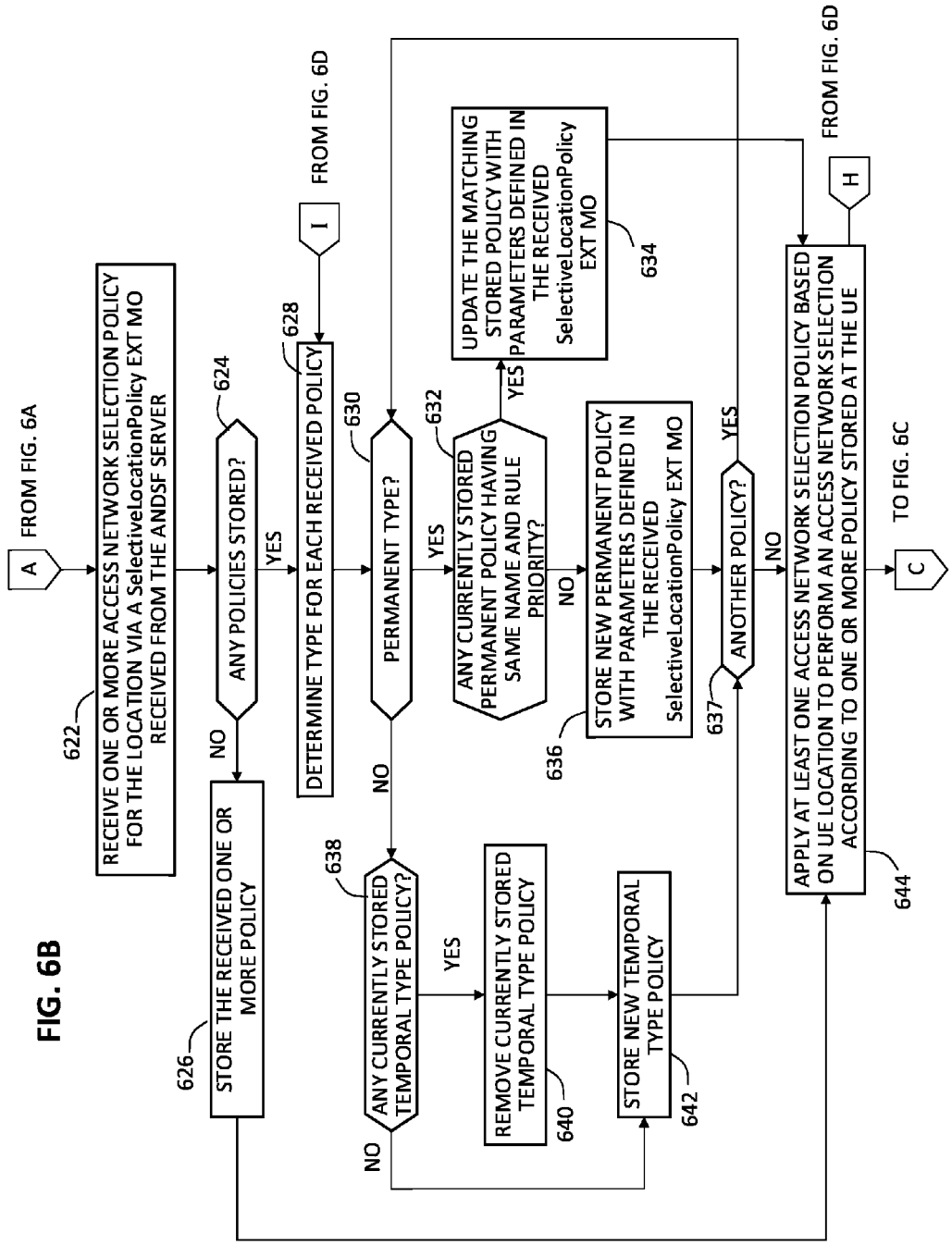
Figure 6D:
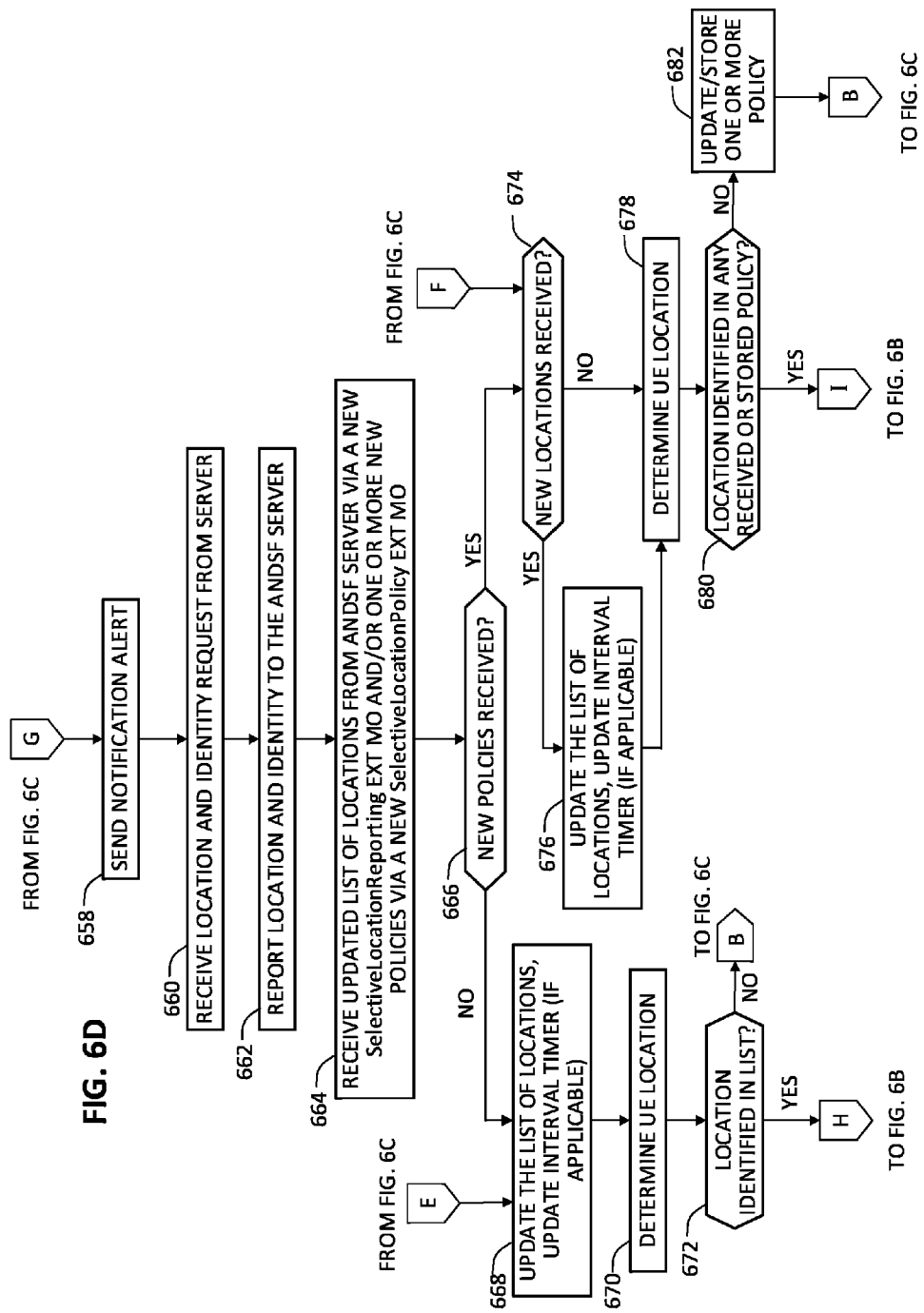

Turning to FIG. 6C, the operations at 646 can be reached, from any of: 614 of FIG. 6A (e.g., UE 102a location is not identified in the list received from the ANDSF server 120); 644 of FIG. 6B (e.g., UE 102a has applied a policy to perform one or more access network selection(s)); and/or 682 of FIG. 6D (e.g., UE has updated/stored one or more policies but not applied the policies because the UE is not at a location that triggers application of any stored SelectiveLocationPolicy EXT MO access network selection policies). At 646, UE 102a monitors whether it has moved, received a new SelectiveLocationReporting EXT MO from the ANDSF server 120, received a new SelectiveLocationPolicy EXT MO from the ANDSF server 120 and/or whether any update interval for any locally stored policy has expired. Generally, operations 646 and any subsequent operations (e.g., any of 648, 650, 652, 654 and/or 656) that can be triggered upon any monitored conditions being met can be performed in parallel by a given UE. At 648, the monitoring can include determining whether the UE has moved. By 'moved' it is meant that the location, as determined via one or more location identifiers of the UE, have changed. If the UE determines that it has moved, the operations can return to 612 at which the UE determines its (new) location and the operations can continue to 614 at which the UE determines whether its location is identified in its list of locations received from the ANDSF server 120 and the operations at 614 can then continue as described above. If UE 102a determines that it has not moved, the monitoring at 646 continues.

At 650, the UE can determine whether it has received a new SelectiveLocationReporting EXT MO from the ANDSF server 120. In various embodiments, the ANDSF server 120 can PUSH new or updated locations to a given UE as determined by the ANDSF server. If the UE has received a new SelectiveLocationReporting EXT MO from the ANDSF server 120, the operations can continue to 668 as shown in FIG. 6D. Operations shown in FIG. 6D are discussed in further detail below. If the UE determines that it has not received a new SelectiveLocationReporting EXT MO from the ANDSF server 120, the monitoring at 646 continues.

At 652, the UE can determine whether it has received a new SelectiveLocationPolicy EXT MO from the ANDSF server 120. In various embodiments, the ANDSF server 120 can PUSH new or updated locations to a given UE as determined by the ANDSF server. If the UE has received a new SelectiveLocationPolicy EXT MO from the ANDSF server 120, the operations can continue to 674 as shown in FIG. 6D. If the UE determines that it has not received a new SelectiveLocationPolicy EXT MO from the ANDSF server 120, the monitoring at 646 continues.

At 654, the UE can determine whether any update interval timer for any policy has expired. If the UE determines at 654 that an update interval timer for a particular access network has expired, the operations can continue to 656 at which the UE resets the update interval timer for either a particular policy to the value stored for the UpdateInterval node of the locally stored policy and restarts the timer or the UE resets the update interval timer for location reporting to the value stored for the UpdateInterval node of the local copy of the SelectiveLocationReporting EXT MO stored at the UE. The operations can then continue to 658 as shown in FIG. 6D.

Referring to FIG. 6D, at 658, UE 102a sends a notification alert to the ANDSF server 120 requesting network selection policies and/or updated reporting locations from the server. At 660, UE 102a receives a location and identity request from the ANDSF server 120. At 662, UE 102a reports its location and identity (e.g., IMSI) to ANDSF server 120. At 664, the UE receives an updated list of locations from the ANDSF server 120 via a new SelectiveLocationReporting EXT MO that can be sent from the server and/or receives one or more new policies via a new SelectiveLocationPolicy EXT MO that can be sent from the server.

At 666, UE 102a determines whether any new policies have been received from the server (e.g., whether the UE has received a new SelectiveLocationPolicy EXT MO from the server). If the UE determines that no new policies have been received, then the UE assumes that only a new list of one or more location for location reporting were received via a new SelectiveLocationReporting EXT MO and the UE stores a list of one or more locations at 668 identified in the EXT MO and, if applicable, updates the interval timer for the location reporting. At 670, the UE determines its current location and at 672 determines whether its current location is identified in the new list of one or more locations. If the UE is at a location identified in the list, the operations return to 644 in FIG. 4B at which UE 102a applies at least one access network selection policy based on the location of the UE to perform access network selection(s) according to one or more policy stored at the UE and the operations continue to 646 shown in FIG. 6C and the monitoring continues. If the UE is not at a location identified in the list, the operations continue to 646 shown in FIG. 6C and the monitoring continues. Operations 668, 670 and 672 can also be triggered following a determination at 650 that the UE has received a new SelectiveLocationReporting EXT MO from the ANDSF server.

If, at 666, UE 102 determines that one or more new policy was received via a new SelectiveLocationPolicy EXT MO being received from the ANDSF server 120, the operations continue to 674 at which the UE also determines whether a new list of one or more locations for location reporting were also received. If the UE determines that a new list of one or more locations were received via a new SelectiveLocationReporting EXT MO, the UE updates its list of locations and the update interval timer for location reporting, if applicable, by storing the new SelectiveLocationReporting EXT MO and the operations continue to 678. If at 674, the UE determines that no new locations were received, the operations continue to 678 (e.g., without performing the location update).

At 678, the UE determines its location and at 680 the UE determines whether its location is identified in any newly received policy or locally stored policy that is not to be removed based on the newly received one or more policies. If the UE determines that its location is not identified in any newly received policy or is identified in any locally stored policy but such policy is to be removed based on the newly received one or more policies, the operations continue to 682 in which the UE merely updates and/or stores its local policies (e.g., using operations similar to those shown at 628, 630, 632, 634, 636, 637, 638, 640 and 642) but does not perform an access network selection based on the policies (e.g., since its current location was not contained in the newly received policies or an old locally stored policy that may have contained the location was removed based on the newly received policies) and the operations return to 646 shown in FIG. 6C and the monitoring continues.

However, if the UE determines at 680 that its location is identified in a newly received policy or is identified in an old locally stored policy that is not to be removed based on the newly received policies, then the operations can continue to 628 and the UE can evaluate each newly received policy for updating/storing and application as described above. Operations 674, 676 (if applicable), 680 and 682 (if applicable) can also be triggered following a determination at 652 that the UE has received a new SelectiveLocationPolicy EXT MO from the ANDSF server.

Accordingly, as shown in FIGS. 6A-6D, a given UE can execute various operations to perform optimized network selection in accordance with at least one embodiment of the present disclosure.

Figure 7:
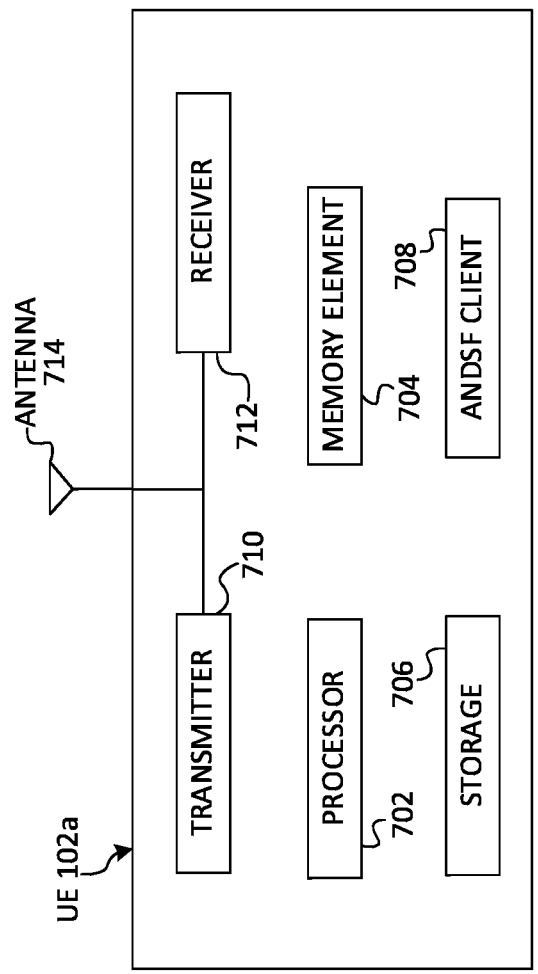
FIG. 7 is a simplified block diagram illustrating example details that can be associated with an example user equipment in accordance with one potential embodiment.

Referring to FIG. 7, FIG. 7 is a simplified block diagram illustrating example details that can be associated with an example UE in accordance with one potential embodiment. FIG. 7 includes UE 102a, which can include at least one processor 702, at least one memory element 704, at least one storage 706, an ANDSF client 708, at least one transmitter 710, at least one receiver 712 and at least one antenna 714. Although the embodiment of FIG. 7 is discussed in relation to UE 102a, it should be understood that the features of 102a could be configured for UE 102b and/or any other UE that may be present in communication system 100.

In at least one embodiment, at least one processor 702 is at least one hardware processor configured to execute various tasks, operations and/or functions of UE 102a as described herein. At least one memory element 704 and/or storage 706 can be configured to store data, information, software and/or instructions associated with the UE 102a. For example, in various embodiments, at least one memory element 704 and/or storage 706 can be configured to store access network discovery and selection parameters, rules, etc. for one or more access network selection policies received from ANDSF server 120 via SelectiveLocationPolicy EXT MOs; one or more locations of interest received from ANDSF server 120 via SelectiveLocationReporting EXT MOs; subscriber/UE information; logic; any other data, information software and/or instructions as discussed for various embodiments described herein (e.g., ANDSF client 708 can, in some embodiments, be stored in at least one memory element 704 and/or storage 706), combinations thereof or the like. In at least one embodiment, at least one transmitter 710, at least one receiver 712 and at least one antenna 714 can be configured to enable over-the-air (OTA) RF communications between UE 102a, one or more 3GPP and/or non-3GPP RAN node(s), and/or one or more other UE.

In at least one embodiment, ANDSF client 708 can include instructions that, when executed (e.g., by at least one processor 702), cause UE 102*a* to perform one or more operations as discussed herein including, but not limited to: maintaining a local SelectiveLocationReporting EXT MO for one or more locations of interest to the ANDSF server 120; maintaining a local SelectiveLocationPolicy EXT MO for one or more policies for the one or more locations of interest to the ANDSF server 120; determining the UE location; sending notification alerts requesting policies for the locations; reporting location and/or identity information to the ANDSF server 120; applying one or more policies provisioned from the ANDSF server 120; exchanging communications with the ANDSF server 120 via the S14 interface; maintaining any ANDSF MO parameters; combinations thereof or any other operations described for various embodiments discussed herein.

In regards to the internal structure associated with communication system 100 described herein, any UE, 3GPP RAN node, non-3GPP RAN node and/or element or node of any 3GPP and/or non-3GPP IP network can be configured to include a respective at least one processor and a respective at least one memory element in accordance with various embodiments. In addition, in some embodiments, storage can be configured for any such UE, 3GPP RAN node, non-3GPP RAN node and/or element or node of any 3GPP and/or non-3GPP IP network. Hence, appropriate software, hardware and/or algorithms are being provisioned for communication system 100 in order to facilitate operations as described for various embodiments discussed herein to facilitate optimized access network selection.

In one example implementation, a UE, an ANDSF server, a 3GPP RAN node, a non-3GPP RAN node and/or element or node of any 3GPP and/or non-3GPP IP network discussed for various embodiments described herein can encompass network appliances, routers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIGS. 1A-1B). Alternatively, one or more of the UE, ANDSF server, 3GPP RAN nodes, non-3GPP RAN nodes and/or element or node of any 3GPP and/or non-3GPP IP network discussed herein can include software (or reciprocating software) that can coordinate in order to achieve operations associated with providing optimized access network selection in a network environment, as outlined herein. In still other embodiments, one or more of the UEs, ANDSF server, 3GPP RAN nodes, non-3GPP RAN nodes and/or element or node of any 3GPP and/or non-3GPP IP network discussed herein may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, the UEs, ANDSF server, 3GPP RAN nodes, non-3GPP RAN nodes and/or element or node of any 3GPP and/or non-3GPP IP network discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to the UEs, ANDSF server, 3GPP RAN nodes, non-3GPP RAN nodes and/or element or node of any 3GPP and/or non-3GPP IP network discussed herein could be provided in any database, register, control list, cache, storage and/or storage structure: all of which can be referenced at any suitable timeframe. Any such storage options may be included within the broad term 'memory element' as used herein. Similarly, any of the potential processing elements, controllers, managers, logic and/or machines described herein should be construed as being encompassed within the broad term 'processor'. Each of the UEs, ANDSF server, 3GPP RAN nodes, non-3GPP RAN nodes and/or element or node of any 3GPP and/or non-3GPP IP network discussed herein can also include suitable interfaces for receiving, transmitting, and/or otherwise communicating data or information in a network environment.

Note that in certain example implementations, operations as outlined herein to facilitate optimized access network selection may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 1A, 1B and 7] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 1A, 1B and 7] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein (e.g., an ANDSF client) could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of the UEs, ANDSF server, 3GPP RAN nodes, non-3GPP RAN nodes and/or element or node of any 3GPP and/or non-3GPP IP network discussed for various embodiments described herein can couple to one another through simple interfaces (as illustrated) or through any other suitable connection (wired or wireless), which provides a viable pathway for network communications. Additionally, any one or more of the UEs, ANDSF server, 3GPP RAN nodes, non-3GPP RAN nodes and/or element or node of any 3GPP and/or non-3GPP IP network discussed herein may be combined or removed from a given deployment based on particular configuration needs. Communications in a network environment are referred to herein as 'messages', 'messaging' and/or 'signaling', which may be inclusive of communications using packets.

Note that in this Specification, references to various features (e.g., elements, structures, nodes, modules, clients, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
  generating a list of one or more locations at which a user equipment (UE) is to selectively initiate location reporting;
  sending the generated list to the UE;
  receiving a notification from the UE indicating that the UE is within a location of the one or more locations;
  in response to receiving the notification from the UE, requesting a location report from the UE;
  receiving the location report from the UE;
  provisioning the UE with one or more access network selection policies based on the location report received from the UE; and
  applying at least one access network selection policy at the UE based on the location report received from the UE.

2. The method of claim 1, further comprising:
  sending the generated list comprising the one or more locations to the UE from an Access Network Discovery and Selection Function (ANDSF) server.

3. The method of claim 2, further comprising:
  sending the location report to the ANDSF server.

4. The method of claim 3, further comprising:
  sending the one or more access network selection policies to the UE from the ANDSF after the location report of the UE is sent to the ANDSF server.

5. The method of claim 1, wherein a particular access network selection policy is a permanent type policy.

6. The method of claim 1, wherein a particular access network selection policy is a temporal type policy.

7. The method of claim 6, wherein the UE is provisioned with only one temporal type policy.

8. The method of claim 1, further comprising:
provisioning the UE with an update interval that indicates a time period upon expiration of which the UE is to request a policy update.

9. One or more non-transitory tangible media encoding logic that includes instructions for execution that when executed by a processor, is operable to perform operations comprising:
generating a list of one or more locations at which a user equipment (UE) is to selectively initiate location reporting;
sending the generated list to the UE;
receiving a notification from the UE indicating that the UE is within a location of the one or more locations;
in response to receiving the notification from the UE, requesting a location report from the UE;
receiving the location report from the UE;
provisioning the UE with one or more access network selection policies based on the location report received from the UE; and
applying at least one access network selection policy at the UE based on the location report received from the UE.

10. The media of claim 9, the operations further comprising:
sending the generated list comprising the one or more locations to the UE from an Access Network Discovery and Selection Function (ANDSF) server.

11. The media of claim 10, further comprising:
sending the location report to the ANDSF server.

12. The media of claim 11, the operations further comprising:
sending the one or more access network selection policies to the UE from the ANDSF server after the location report of the UE is sent to the ANDSF.

13. The media of claim 9, wherein a particular access network selection policy is a permanent type policy.

14. The media of claim 9, wherein a particular access network selection policy is a temporal type policy.

15. The media of claim 14, wherein the UE is provisioned with only one temporal type policy.

16. The media of claim 9, the operations further comprising:
provisioning the UE with an update interval that indicates a time period upon expiration of which the UE is to report its location.

17. A system comprising:
a first memory element for storing data; and
a processor to execute instructions associated with the data that, when executed, system is generated to:
generate a list of one or more locations at which a user equipment (UE) is to selectively initiate location reporting;
sending the generated list to the UE;
receive a notification from the UE indicating that the UE is within a location of the one or more locations;
in response to receiving the notification from the UE, request a location report from the UE;
receive the location report from the UE;
provision the UE with one or more access network selection policies based on the location report received from the UE; and
apply at least one access network selection policy at the UE based on the location report received from the UE.

18. The system of claim 17, the processor to execute further instructions associated with the data that, when executed, the system is further configured to:
send the generated list comprising the one or more locations to the UE from an Access Network Discovery and Selection Function (ANDSF) server.

19. The system of claim 18, the processor to execute further instructions associated with the data that, when executed, the system is further configured to:
send the one or more access network selection policies to the UE from the ANDSF server after the location report of the UE is sent to the ANDSF server.

20. The system of claim 17, wherein a particular access network selection policy is a permanent type policy.

* * * * *